United States Patent
Inai

(10) Patent No.: US 8,862,850 B2
(45) Date of Patent: Oct. 14, 2014

(54) STORAGE SYSTEM, STORAGE CONTROL APPARATUS, AND STORAGE CONTROL METHOD

(75) Inventor: Yusuke Inai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 13/399,095

(22) Filed: Feb. 17, 2012

(65) Prior Publication Data

US 2012/0226882 A1  Sep. 6, 2012

(30) Foreign Application Priority Data

Mar. 4, 2011  (JP) .................................. 2011-047526

(51) Int. Cl.
*G06F 12/00* (2006.01)
*G06F 3/06* (2006.01)

(52) U.S. Cl.
CPC ............ *G06F 3/0617* (2013.01); *G06F 3/0686* (2013.01); *G06F 3/0659* (2013.01)
USPC ..... 711/167; 711/115; 711/103; 711/E12.001

(58) Field of Classification Search
CPC .... G06F 3/0655; G06F 3/0686; G06F 3/0617
USPC ........................... 711/115, 103, 167, E12.001
See application file for complete search history.

(56) References Cited

U.S. PATENT DOCUMENTS

| | | | |
|---|---|---|---|
| 6,338,006 B1 * | 1/2002 | Jesionowski et al. | 700/214 |
| 8,127,068 B2 * | 2/2012 | Georgis | 711/115 |
| 8,539,147 B2 * | 9/2013 | Toshine | 711/112 |

FOREIGN PATENT DOCUMENTS

| | | | |
|---|---|---|---|
| JP | 2006-172400 A | 6/2006 | |
| JP | 2007-293778 A | 11/2007 | |

* cited by examiner

*Primary Examiner* — Pierre-Michel Bataille
(74) *Attorney, Agent, or Firm* — Fujitsu Patent Center

(57) ABSTRACT

In a storage system, a processor accepts designation of export data that is to be written to a first portable record medium. The designated export data is divided into first export data and second export data. The first export data is already in the storage apparatus, while the second export data is still in second portable record mediums. The second export data is read out of the second portable record mediums and entered to the storage apparatus. The processor detects the current amount of the first export data in the storage apparatus, as well as the current amount of the second export data still unread from the second portable record mediums. The processor determines when to start writing the export data to the first portable record medium, based on the current amount of the first export data and the current amount of the second export data.

17 Claims, 17 Drawing Sheets

231 MASTER LV LIST

| LV NAME | CACHE STATE | STORE TAPE NAME | LV SIZE (Kbyte) | EXPORT START TIME | EXPORT FREQUENCY |
|---|---|---|---|---|---|
| VT0000 | ON | PVT001 | 1024000 | 2010.08.01.··· | 6 |
| VT0001 | ON | PVT003 | 4096000 | 2010.08.01.··· | 3 |
| VT0002 | OFF | PVT004 | 2048000 | 2010.08.01.··· | 5 |
| VT0003 | ON | PVT003 | 8192000 | 2010.08.01.··· | 1 |
| VT0004 | OFF | PVT004 | 2048000 | 2010.08.01.··· | 4 |
| VT0005 | OFF | PVT002 | 1024000 | 2010.08.01.··· | 5 |
| VT0006 | ON | PVT002 | 1024000 | 2010.08.01.··· | 2 |
| VT0007 | OFF | PVT005 | 4096000 | 2010.08.01.··· | 4 |
| VT0008 | OFF | PVT004 | 4096000 | 2010.08.01.··· | 2 |
| VT0009 | OFF | PVT005 | 1024000 | 2010.08.01.··· | 3 |
| ⋮ | ⋮ | ⋮ | ⋮ | ⋮ | ⋮ |

FIG. 5

232 OFF-CACHE LV LIST

| LV NAME | STORE TAPE NAME | LV SIZE (Kbyte) |
|---|---|---|
| VT0002 | PVT004 | 2048000 |
| VT0004 | | 2048000 |
| VT0008 | | 4096000 |
| VT0007 | PVT005 | 4096000 |
| VT0009 | | 1024000 |
| VT0005 | PVT002 | 1024000 |

FIG. 6

233 ON-CACHE LV LIST

| LV NAME | STORE TAPE NAME | LV SIZE (Kbyte) |
|---|---|---|
| VT0003 | PVT003 | 8192000 |
| VT0001 | PVT003 | 4096000 |
| VT0000 | PVT001 | 1024000 |
| VT0006 | PVT002 | 1024000 |

FIG. 7

STORAGE SYSTEM, STORAGE CONTROL APPARATUS, AND STORAGE CONTROL METHOD

CROSS-REFERENCE TO RELATED APPLICATION

This application is based upon and claims the benefit of priority of the prior Japanese Patent Application No. 2011-047526, filed on Mar. 4, 2011, the entire contents of which are incorporated herein by reference.

FIELD

The embodiments discussed herein are related to a storage system, a storage control apparatus, and a storage control method.

BACKGROUND

In recent years a hierarchical virtual storage system in which an inexpensive large-capacity record medium, such as a magnetic tape, is used as a back-end library apparatus and in which a record medium, such as an HDD (Hard Disk Drive), access to which can be gained at a higher speed is used as a cache apparatus has become known. With a virtual storage system data stored in a cache apparatus looks like data in a library apparatus from a host apparatus. As a result, the host apparatus can use a large-capacity storage area provided by the library apparatus as if it were connected to the host apparatus.

Furthermore, with some virtual storage systems a logical volume generated on a magnetic tape contained in a library apparatus can be recorded on an external save magnetic tape and be saved outside. The function of ejecting a magnetic tape on which a logical volume is recorded to the outside is referred to as, for example, an "export function". With some virtual storage systems having the export function, for example, mounting a record medium on a library apparatus and ejecting a record medium from the library apparatus are managed by the set including a plurality of record mediums, and a logical volume is managed by associating it with a set.

Another example of a storage apparatus is as follows. An ejection opening and an insertion opening for a virtual tape are virtually prepared and the virtual tape is moved to the ejection opening. When instructions to output the virtual tape to a removable medium are given, the virtual tape in the ejection opening is written to the removable medium and the virtual tape is moved to the insertion opening.
Japanese Laid-open Patent Publication No. 2006-172400
Japanese Laid-open Patent Publication No. 2007-293778

By the way, in order to realize the above export function, a logical volume which is an export object is copied from a cache apparatus to an external save magnetic tape. If the logical volume which is an export object is not stored in the cache apparatus, the logical volume is read out from a magnetic tape to the cache apparatus and the logical volume read out is written to the external save magnetic tape.

If reading out data from the magnetic tape to the cache apparatus is necessary, there is a possibility that while the data is being read out, the operation of writing to the external save magnetic tape will be discontinued halfway. A state in which the operation of writing to the external save magnetic tape is discontinued halfway means a state in which the magnetic tape that is not being read or written occupies a tape drive. Such a state contributes to a fall in the efficiency of the use of the tape drive. As a result, a long time may be taken to perform an entire export process.

SUMMARY

According to an aspect of the present invention, there is provided a storage system that includes: a plurality of access devices which access a portable record medium; a transport device which transports a plurality of portable record mediums between a storage location thereof and the plurality of access devices; a storage apparatus which temporarily stores data recorded on a portable record medium placed in the storage location; and a control apparatus which controls data transfer via the plurality of access devices between a portable record medium placed in the storage location and the storage apparatus, wherein the control apparatus performs a procedure including: accepting designation of plural pieces of ejection object data to be written to an ejection portable record medium, of data stored on the plurality of portable record mediums; detecting a first data amount of ejection object data, of the plural pieces of ejection object data, which is stored in the storage apparatus and which is not yet written to the ejection portable record medium via one of the plurality of access devices and a second data amount of ejection object data, of the plural pieces of ejection object data, which is not stored in the storage apparatus at the time of the plural pieces of ejection object data being designated and for which reading out from the plurality of portable record mediums or storing in the storage apparatus for the writing to the ejection portable record medium is not yet performed; and controlling timing at which the writing is begun on the basis of the first data amount and the second data amount detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an example of information registered in a master logical volume (LV) list;

FIG. 6 is an example of information registered in an off-cache LV list;

FIG. 7 is an example of information registered in an on-cache LV list;

DESCRIPTION OF EMBODIMENTS

Figure 1:
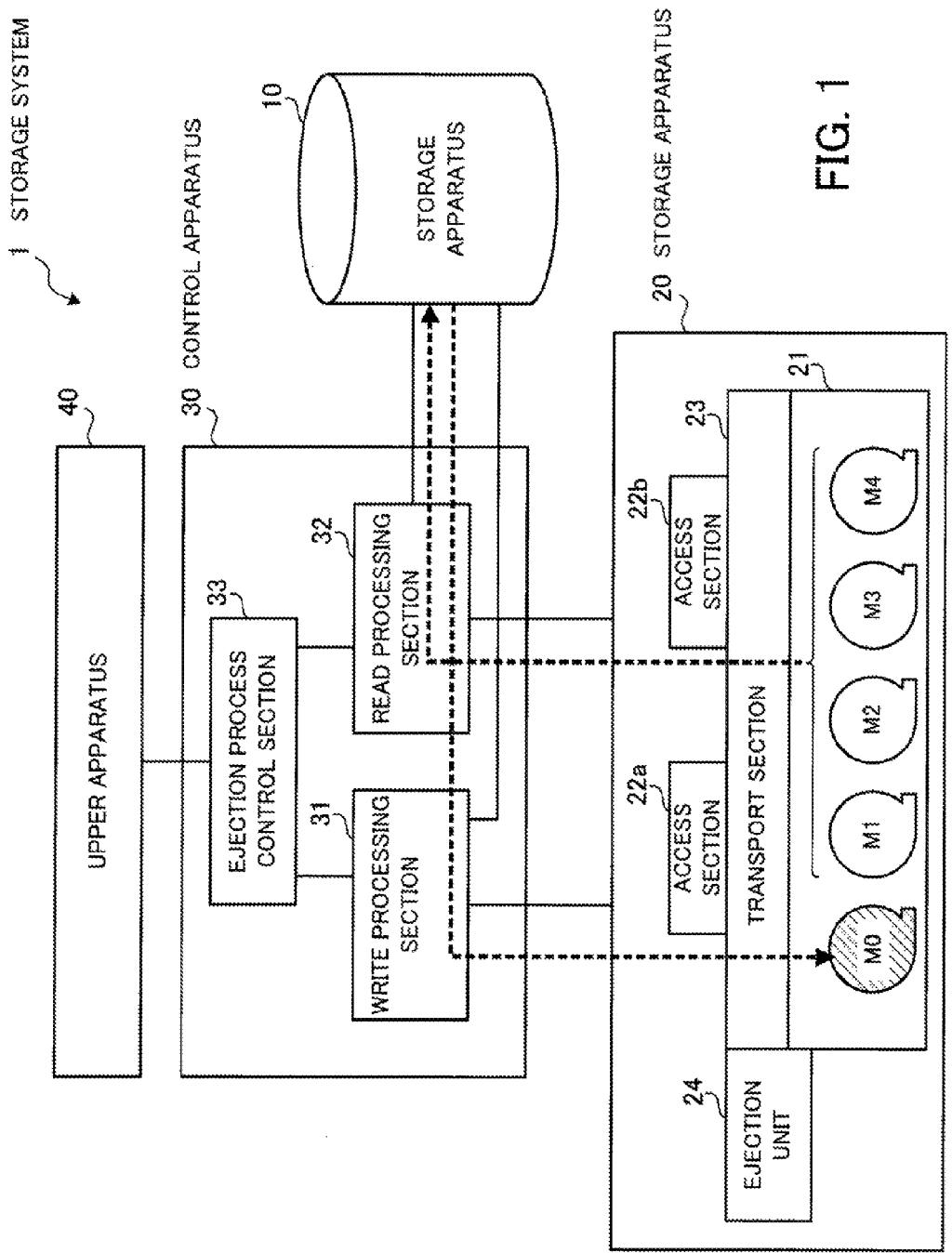
FIG. 1 is an example of the structure of a storage system according to a first embodiment.

Embodiments will now be described in detail with reference to the accompanying drawings, wherein like reference numerals refer to like elements throughout.

First Embodiment

FIG. 1 is an example of the structure of a storage system according to a first embodiment.

A storage system 1 illustrated in FIG. 1 includes storage apparatus 10 and 20 and a control apparatus 30. In addition, an upper apparatus 40 is connected to the control apparatus 30.

The storage apparatus 10 stores data by the use of an HDD, an SSD (Solid State Drive), or the like. On the other hand, the storage apparatus 20 stores data in storage areas of a plurality of portable record mediums.

The storage apparatus 20 includes a store section 21 which contains the plurality of portable record mediums, access sections 22a and 22b which gain access to data on a portable record medium contained in the store section 21, and a transport section 23 which transports a portable record medium between the store section 21 and the access section 22a or 22b. In addition, the transport section 23 includes an ejection unit 24 and can eject a portable record medium from the ejection unit 24 to the outside.

The control apparatus 30 controls data transfer via the access section 22a or 22b between the storage apparatus 10 and a portable record medium in the storage apparatus 20. A portable record medium in the storage apparatus 20 is accessed in the following way. The control apparatus 30 controls the transport section 23 of the storage apparatus 20 to transport a portable record medium on which desired data is stored to the access section 22a or 22b and read the data from or write data to the portable record medium via the access section 22a or 22b. Furthermore, the control apparatus 30 can access data on separate portable record mediums in parallel via the access sections 22a and 22b. In the example of FIG. 1, the number of the access sections included in the storage apparatus 20 is two. However, the storage apparatus 20 may include three or more access sections.

In response to an access request from, for example, the upper apparatus 40, the control apparatus 30 controls access to data on a portable record medium in the storage apparatus 20. In FIG. 1 it is assumed that record mediums M1 through M4 contained in the store section 21 of the storage apparatus 20 store data to be accessed by the upper apparatus 40. However, record mediums which store data to be accessed by the upper apparatus 40 are not limited to these four record mediums. A request to access a portable record medium in the storage apparatus 20 may be made via, for example, an input device (not illustrated) connected to the control apparatus 30.

In addition, the control apparatus 30 has the function of caching data stored on a portable record medium in the storage apparatus 20 in the storage apparatus 10. When the control apparatus 30 receives a write request from, for example, the upper apparatus 40, the control apparatus 30 temporarily stores data to be written in the storage apparatus 10 and then copies the data to be written from the storage apparatus 10 to one of the record mediums M1 through M4 in the storage apparatus 20. Furthermore, the control apparatus 30 may receive a read request from, for example, the upper apparatus 40. If data to be read out is cached in the storage apparatus 10, then the control apparatus 30 reads out the data to be read out from the storage apparatus 10 and transmits it to the upper apparatus 40. On the other hand, if the data to be read out is not cached in the storage apparatus 10, then the control apparatus 30 reads out the data to be read out from one of the record mediums M1 through M4 in the storage apparatus 20. At this time the control apparatus 30 not only temporarily stores it in the storage apparatus 10 but also transmits it to the upper apparatus 40. The control apparatus 30 uses the storage apparatus 10 as a cache in this way. As a result, storage areas of the record mediums M1 through M4 in the storage apparatus 20 are virtually provided to the upper apparatus 40 via the storage apparatus 10.

For example, an apparatus other than the control apparatus 30 may perform a control process for caching data stored on a portable record medium in the storage apparatus 20 in the storage apparatus 10.

Furthermore, the control apparatus 30 can perform a "data ejection process" for copying data stored on the record mediums M1 through M4 to an ejection record medium M0 and ejecting the ejection record medium M0 from the ejection unit 24. With the data ejection process the control apparatus 30 writes data designated as an ejection object to the ejection record medium M0 via the storage apparatus 10. For example, at the time when the control apparatus 30 receives a data ejection request, data which is an object of the ejection request may be cached in the storage apparatus 10. In this case, the control apparatus reads out the data from the storage apparatus 10 and writes the data to the ejection record medium M0. However, if the data which is an object of the ejection request is not cached in the storage apparatus 10, then the control apparatus 30 reads out the data from a corresponding portable record medium in the store section 21, temporarily stores the data in the storage apparatus 10, reads out the data from the storage apparatus 10, and writes the data to the ejection record medium M0.

The control apparatus 30 performs the data ejection process by the fixed- or variable-length data block.

In the following description it is assumed that the control apparatus 30 accepts a data ejection request and designation of a data block as an ejection object from the upper apparatus 40. However, the control apparatus 30 may accept a data ejection request and designation of a data block as an ejection object from, for example, an input device connected to the control apparatus 30.

Furthermore, in the following description it is assumed that the control apparatus 30 accepts designation of more than one of data blocks stored on the record mediums M1 through M4 as an ejection object. In the following description data blocks designated as an ejection object will be referred to as "ejection object data".

The control apparatus 30 includes a write processing section 31, a read processing section 32, and an ejection process control section 33 as processing functions for realizing a data ejection process. For example, a CPU (Central Processing Unit) included in the control apparatus 30 executes determined programs. By doing so, processes by the write processing section 31, the read processing section 32, and the ejection process control section 33 are realized.

The write processing section 31 reads out ejection object data, of plural pieces of ejection object data designated by the upper apparatus 40, which is stored in the storage apparatus 10 from the storage apparatus 10 and writes the ejection object data to the ejection record medium M0 via one of the access sections 22a and 22b. The "ejection object data stored in the storage apparatus 10" includes ejection object data which is cached in the storage apparatus 10 at the time of a data ejection request being made and ejection object data which is read out from a portable record medium in the store section 21 by the read processing section 32 and which is stored in the storage apparatus 10 by the read processing section 32.

At the time when the plural pieces of ejection object data are designated by the upper apparatus 40, the read processing section 32 reads out ejection object data, of the plural pieces of ejection object data, which is not stored in the storage apparatus 10 from at least one of the record mediums M1 through M4 via at least one of the access sections 22a and 22b. The read processing section 32 stores the ejection object data read out in the storage apparatus 10 as data to be written by the write processing section 31. That is to say, the ejection object data stored in the storage apparatus 10 by the read processing section 32 is then written to the ejection record medium M0 by the write processing section 31.

The ejection process control section 33 detects data amounts D1 and D2 until the write processing section 31 begins to write to the ejection record medium M0. The data amount D1 is the total amount of ejection object data, of the plural pieces of ejection object data designated by the upper apparatus 40, which is stored in the storage apparatus 10. The data amount D1 includes not only the total amount of ejection object data cached in the storage apparatus 10 at the time of the data ejection request being made but also the total amount of ejection object data which is read out from at least one of the record mediums M1 through M4 by the read processing section 32 and which is stored in the storage apparatus 10 by the read processing section 32. On the other hand, the data amount D2 is the total amount of remaining ejection object data, of the plural pieces of ejection object data designated by the upper apparatus 40, which is to be read out from the record mediums M1 through M4 to the storage apparatus 10 by the read processing section 32.

On the basis of at least the data amounts D1 and D2, the ejection process control section 33 controls timing at which the write processing section 31 begins to write to the ejection record medium M0. As a result, writing to the ejection record medium M0 by the write processing section 31 is hardly discontinued.

For example, if D1>D2, the ejection process control section 33 makes the write processing section 31 begin to write to the ejection record medium M0. It is assumed that each of the access sections 22a and 22b reads out data from and writes data to a portable record medium at the same speed. In this case, it is assumed that the process by the write processing section 31 of writing ejection object data to the ejection record medium M0 via one access section and the process by the read processing section 32 of reading out ejection object data from at least one of the record mediums M1 through M4 via the other access section are performed in parallel. If the condition D1>D2 is met, the probability that the read process terminates before the termination of the write process increases. As a result, the possibility that the number of times the write process is discontinued after the beginning of the write process by the write processing section 31 decreases or the possibility that time for which the write process is discontinued after the beginning of the write process by the write processing section 31 is reduced increases.

A state in which the write process by the write processing section 31 is discontinued means a state in which the ejection record medium M0 that is not being written occupies one of the access sections 22a and 22b. Such a state contributes to a fall in the efficiency of the use of the access section 22a or 22b. For example, if there remain many portable record mediums from which the read processing section 32 should read out ejection object data, it may safely be said that for a period for which the ejection record medium M0 writing to which is discontinued occupies an access section, the access section on which the ejection record medium M0 is mounted can originally be assigned to reading out ejection object data that is not yet read out from another portable record medium (one of the record mediums M1 through M4). From this point of view it may safely be said that a state in which the write process by the write processing section 31 is discontinued leads to a fall in the efficiency of the use of the access section 22a or 22b. As a result, time taken to perform an entire data ejection process may become long.

In addition, a long time is taken to perform the operation of unmounting a portable record medium from an access section and the operation of mounting a portable record medium on the access section. As a result, this time has a great influence on time taken to perform an entire data ejection process. Accordingly, it is desirable to make the number of times these operations are performed as small as possible. However, for example, it is assumed that when writing to the ejection record medium M0 is discontinued, the ejection record medium M0 is unmounted from the access section, another portable record medium is mounted on the access section, and reading out ejection object data that is not yet read out is begun. In this case, it is necessary to at least mount the ejection record medium M0 again on any access section later on and resume writing data. Accordingly, a long time is taken to unmount the ejection record medium M0 from the access section and mount the ejection record medium M0 again on any access section later on. As a result, time taken to perform the entire data ejection process becomes long.

On the other hand, if the write process by the write processing section 31 is not discontinued, there is no need to unmount the ejection record medium M0 from the access section during the write process. That is to say, unmounting the ejection record medium M0 from the access section and mounting the ejection record medium M0 again on any access section later on is a waste of time and can be avoided. As a result, time taken to perform the entire data ejection process can be reduced. Therefore, if D1>D2, the ejection process control section 33 makes the write processing section 31 begin to perform the write process. By doing so, the write process by the write processing section 31 is hardly discontinued. As a result, the possibility that time taken to perform the entire data ejection process can be reduced increases.

Furthermore, in a state in which the condition D1>D2 is not met, the ejection process control section 33 may make the read processing section 32 perform the read process without making the write processing section 31 begin to perform the write process. In this case, the read processing section 32 can read out data in parallel by the use of both the access sections 22a and 22b. Accordingly, time taken to meet the condition D1>D2 is reduced. As a result, time taken to perform the entire data ejection process can be reduced.

Moreover, on the basis of not only the above condition regarding the data amounts D1 and D2 but also the number X of access sections included in the storage apparatus 20 and the number Y of portable record mediums which store remaining ejection object data to be read out by the read processing section 32, the ejection process control section 33 may control timing at which the write processing section 31 begins to perform the write process. By doing so, time taken to perform the entire data ejection process can be controlled.

For example, when one of the conditions D1>D2 and Y>X is not met, the ejection process control section 33 makes the read processing section 32 perform the read process without making the write processing section 31 perform the write process. When both the conditions D1>D2 and Y>X are met, the ejection process control section 33 makes the write processing section 31 begin to perform the write process. By doing so, the read process by the read processing section 32 can be terminated more reliably before the termination of the write process by the write processing section 31 even if ejection object data to be read out by the read processing section 32 is distributed among many portable record mediums and is stored on them. Therefore, the possibility that time taken to perform the entire data ejection process can be reduced increases.

An embodiment in which a magnetic tape is used as a portable record medium will now be described.

Second Embodiment

Figure 2:
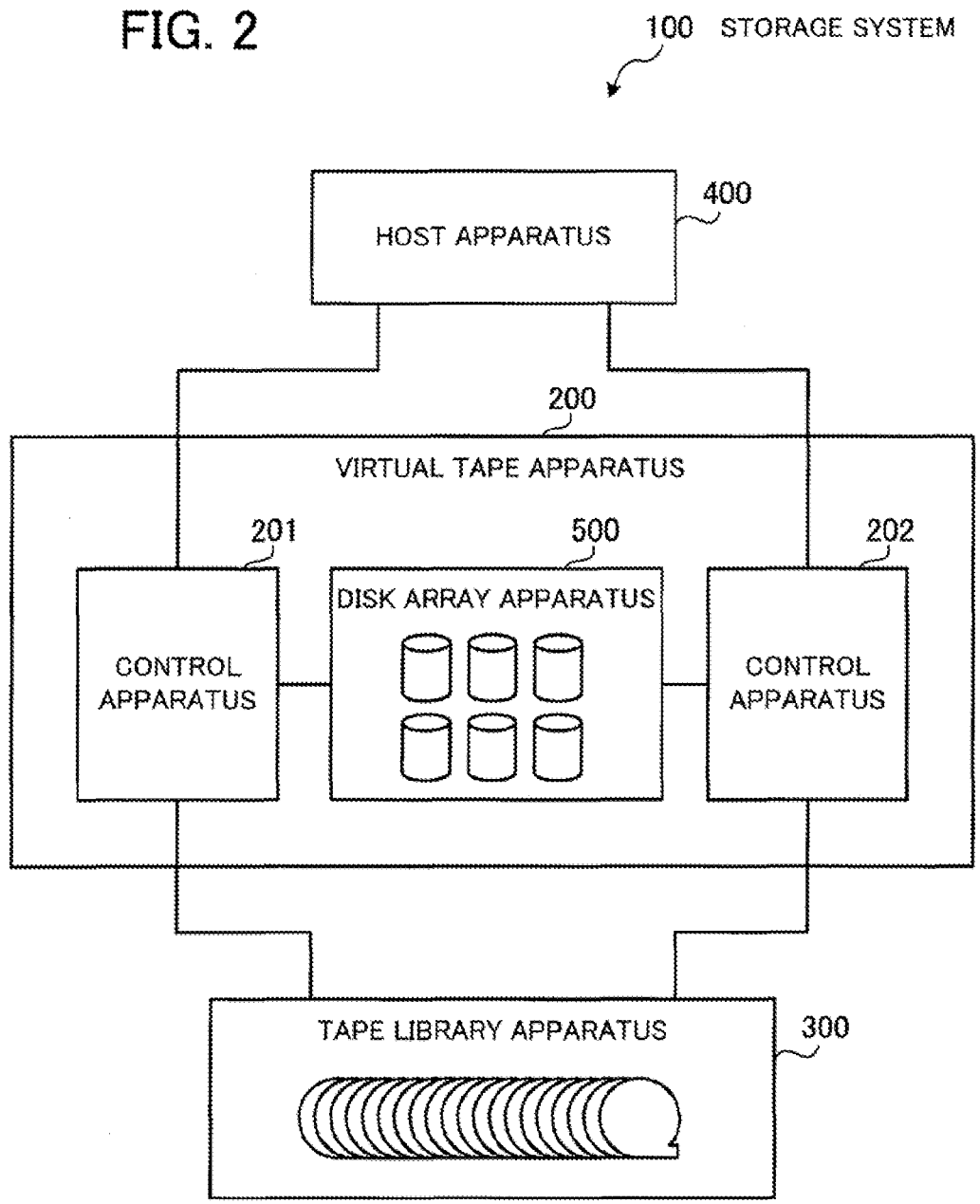
FIG. 2 is an example of the structure of a storage system according to a second embodiment.

FIG. 2 is an example of the structure of a storage system according to a second embodiment. A storage system 100 illustrated in FIG. 2 includes a virtual tape apparatus 200, a tape library apparatus 300, and a host apparatus 400.

The tape library apparatus 300 is a storage apparatus in which a magnetic tape is used as a record medium. As described later, the tape library apparatus 300 includes a plurality of tape drives which access data on a magnetic tape, a mechanism which transports a tape cartridge containing magnetic tapes, and the like. The tape library apparatus 300 may be contained in the same enclosure that contains, for example, the virtual tape apparatus 200.

The virtual tape apparatus 200 includes control apparatus 201 and 202 and a disk array apparatus 500. The disk array apparatus 500 is a storage apparatus including a plurality of HDDs. In this embodiment it is assumed that the control apparatus 201 and 202 and the disk array apparatus 500 are contained in the same enclosure. However, they may be contained in different enclosures.

Each of the control apparatus 201 and 202 controls the operation of the transfer of data between the host apparatus 400 and the disk array apparatus 500 or the operation of the transfer of data between the disk array apparatus 500 and the tape library apparatus 300. Each of the control apparatus 201 and 202 exercises control so that the storage system 100 will function as a hierarchical virtual tape library system in which a magnetic tape in the tape library apparatus 300 is used as a back-end library apparatus and in which an HDD in the disk array apparatus 500 is used as a cache apparatus. With a virtual tape library system the host apparatus 400 can virtually use a large-capacity storage area realized by the tape library apparatus 300 via the disk array apparatus 500.

A portable record medium, such as an optical disk or a magneto-optical disk, may be used in place of a magnetic tape as a record medium used as a back-end library apparatus in the virtual tape library system. Furthermore, an SSD or the like may be used in place of an HDD as a storage apparatus used as a cache apparatus in the virtual tape library system.

The control apparatus 201 and 202 control the operation of the transfer of data in, for example, different logical volumes. In addition, if a fault occurs in, for example, one of the control apparatus 201 and 202, the operation of the virtual tape library system can be continued only by the other control apparatus.

Moreover, each of the control apparatus 201 and 202 can perform an "export process". That is to say, each of the control apparatus 201 and 202 can copy data in a logical volume which the host apparatus 400 requests to eject to an ejection magnetic tape, and eject the ejection magnetic tape from the tape library apparatus 300 to the outside. A logical volume on a magnetic tape ejected to the outside as a result of an export process can be used in, for example, another virtual tape library system.

The host apparatus 400 transmits an access request to at least one of the control apparatus 201 and 202 in response to input operation by a user. By doing so, the host apparatus 400 accesses a logical volume in the virtual tape library system. In addition, the host apparatus 400 can designate any logical volume and make the control apparatus 201 or 202 perform an export process on the designated logical volume.

Figure 3:
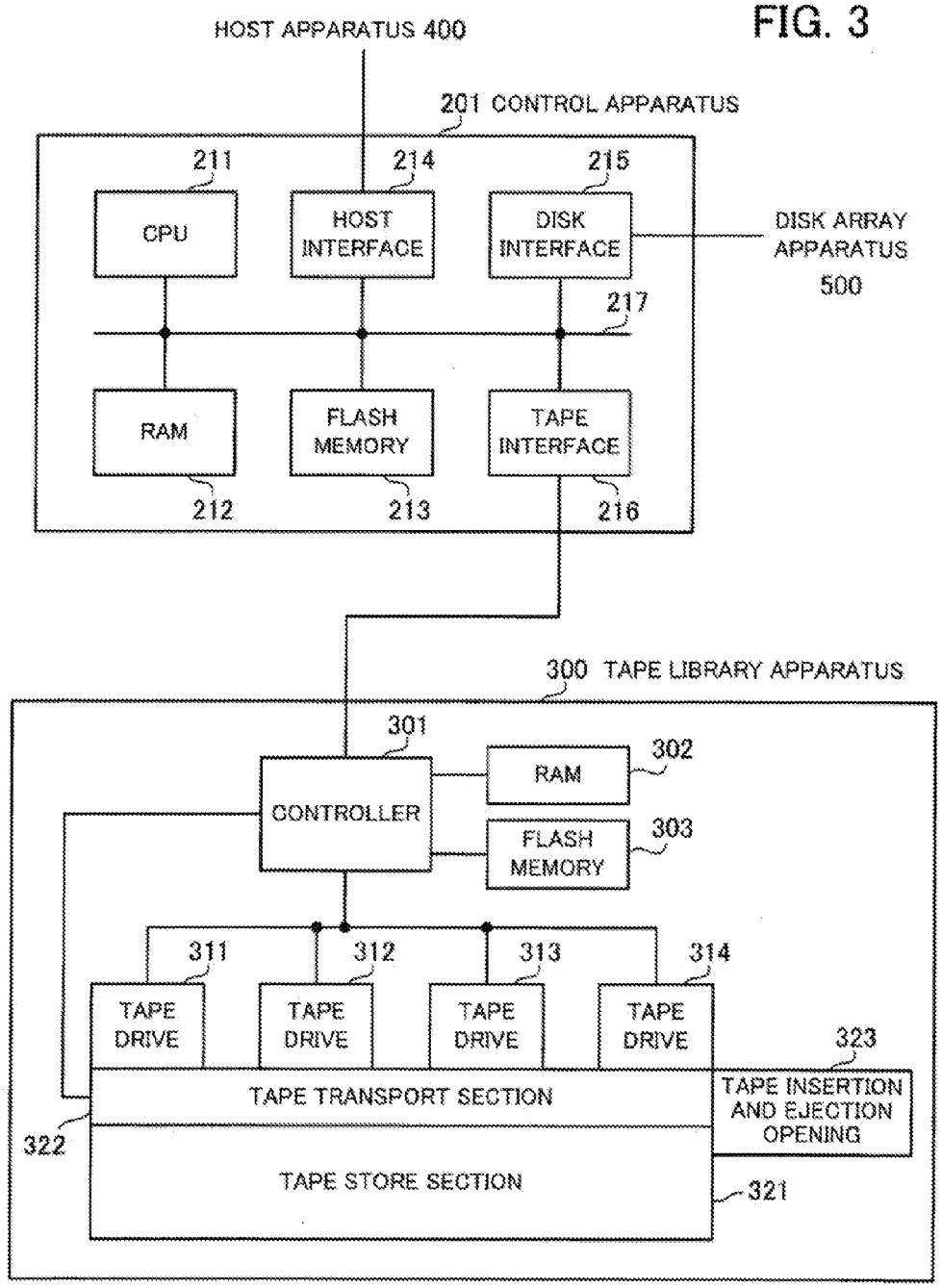
FIG. 3 is an example of the hardware configuration of a control apparatus and a tape library apparatus.

FIG. 3 is an example of the hardware configuration of the control apparatus and the tape library apparatus.

The control apparatus 201 and 202 have the same hardware configuration and can perform the same processes. Accordingly, the hardware configuration of the control apparatus 201 and processes performed by the control apparatus 201 will be described. Descriptions of the control apparatus 202 will be omitted.

The control apparatus 201 is realized as a computer like that illustrated in FIG. 3. The whole of the control apparatus 201 is controlled by a CPU 211. A RAM (Random Access Memory) 212 and a plurality of peripheral units are connected to the CPU 211 via a bus 217.

The RAM 212 is used as main storage of the control apparatus 201. The RAM 212 temporarily stores at least a part of a firmware program executed by the CPU 211. The RAM 212 also stores various pieces of data which the CPU 211 needs to perform a process.

A flash memory 213, a host interface 214, a disk interface 215, and a tape interface 216 are peripheral units connected to the bus 217.

The flash memory 213 is used as secondary storage of the control apparatus 201. The flash memory 213 stores a firmware program and various pieces of data. Another kind of nonvolatile storage, such as an HDD, may be used as secondary storage.

The host interface 214 is a communication interface which transmits data to or receives data from the host apparatus 400. The disk interface 215 is a communication interface which transmits data to or receives data from the disk array apparatus 500. The tape interface 216 is a communication interface which transmits data to or receives data from the tape library apparatus 300.

The host apparatus 400 can be realized as a computer including a CPU, a RAM, peripheral units, and the like. This is the same with the control apparatus 201.

The tape library apparatus 300 includes a controller 301, a RAM 302, a flash memory 303, tape drives 311 through 314, a tape store section 321, a tape transport section 322, and a tape insertion and ejection opening 323.

The controller 301 includes, for example, a CPU inside and controls the whole of the tape library apparatus 300. The RAM 302 temporarily stores at least a part of a firmware program executed by the controller 301. The RAM 302 also stores various pieces of data which the controller 301 needs to perform a process. The flash memory 303 stores a firmware program and various pieces of data.

Each of the tape drives 311 through 314 mounts tape cartridges transported by the tape transport section 322 one by one, and writes data on or reads out data from a magnetic tape in a mounted tape cartridge under the control of the controller 301. In this embodiment the tape library apparatus 300 includes four tape drives. However, there is no special limit to the number of tape drives so long as two or more tape drives are included.

The tape store section 321 contains a plurality of tape cartridges. Tape cartridges contained in the tape store section 321 are divided broadly into tape cartridges used as a part of the virtual tape library system and tape cartridges for export. In the following description magnetic tapes in the former tape cartridges and the latter tape cartridges are referred to as "library magnetic tapes" and "export magnetic tapes" respectively. The control apparatus 201 or 202 determines whether to use a magnetic tape as a library magnetic tape or an export magnetic tape.

The tape transport section 322 transports a tape cartridge under the control of the controller 301. For example, the tape transport section 322 transports a tape cartridge contained in the tape store section 321 to one of the tape drives 311 through 314 and mounts the tape cartridge on it. In addition, the tape transport section 322 unmounts a tape cartridge from the tape drive 311, 312, 313, or 314, transports the tape cartridge to the tape store section 321, and stores the tape cartridge in the tape store section 321.

Furthermore, the tape transport section 322 includes the tape insertion and ejection opening 323. In response to a request from the controller 301, the tape transport section 322 can eject a tape cartridge transported from the tape drive 311, 312, 313, or 314 or the tape store section 321 from the tape insertion and ejection opening 323 to the outside or transport a tape cartridge inserted from the tape insertion and ejection opening 323 to the tape drive 311, 312, 313, or 314 or the tape store section 321.

By the way, as stated above, the control apparatus 201 can perform an export process. When the control apparatus 201 accepts from the host apparatus 400 a request to perform an export process, the control apparatus 201 controls the tape library apparatus 300 to mount an export magnetic tape on one of the tape drives 311 through 314. The control apparatus 201 transmits a logical volume designated by the host apparatus 400 to the tape library apparatus 300 and writes the logical volume on the export magnetic tape.

If the logical volume designated by the host apparatus 400 is cached in the disk array apparatus 500, that is to say, the logical volume designated by the host apparatus 400 is in an "on-cache state" in this export process, then the control apparatus 201 reads out the designated logical volume from the disk array apparatus 500, transmits the designated logical volume to the tape library apparatus 300, and writes the designated logical volume on the export magnetic tape.

On the other hand, if the logical volume designated by the host apparatus 400 is not cached in the disk array apparatus 500, that is to say, the logical volume designated by the host apparatus 400 is in an "off-cache state", then the control apparatus 201 reads out the designated logical volume from a library magnetic tape in the tape library apparatus 300 and stores the designated logical volume in the disk array apparatus 500. The control apparatus 201 then transmits the logical volume stored in the disk array apparatus 500 to the tape library apparatus 300, and writes the logical volume on the export magnetic tape.

The process of reading out the logical volume in an off-cache state from the library magnetic tape and storing the logical volume in the disk array apparatus 500 is referred to as an "on-cache" process.

As stated above, if the logical volume designated as an export object is in an off-cache state, then an on-cache process is necessary. As a result, time taken to perform an entire export process becomes longer. Furthermore, if the library magnetic tape on which the designated logical volume is stored is not mounted on the tape drive 311, 312, 313, or 314, it is necessary for the tape transport section 322 to mount the library magnetic tape. As a result, time taken to perform an entire export process becomes even longer.

In addition, the control apparatus 201 can accept from the host apparatus 400 designation of a plurality of logical volumes as an export object. If many logical volumes in an off-cache state are included among the plurality of logical volumes designated as an export object and the logical volumes in an off-cache state are distributed among many magnetic tapes, then a library magnetic tape is mounted and unmounted frequently in the tape library apparatus 300. As the number of times a library magnetic tape is mounted and unmounted increases, time taken to read logical volumes from library magnetic tapes to the disk array apparatus 500 becomes longer.

Moreover, it may be necessary to unmount and remount the export magnetic tape, depending on the use of the tape drives. In such a case, time taken to write to the export magnetic tape also becomes longer.

An export process has the following characteristics. If the host apparatus 400 designates a plurality of logical volumes as an export object, it is not necessary that the order in which the plurality of logical volumes are written to an export magnetic tape match order designated by the host apparatus 400. In addition, if the tape library apparatus 300 includes the tape drives 311 through 314 as illustrated in FIG. 3, then an on-cache process for reading from a library magnetic tape to the disk array apparatus 500 and a process for writing from the disk array apparatus 500 to an export magnetic tape can be performed in parallel. Furthermore, the number of on-cache processes for reading from a library magnetic tape to the disk array apparatus 500 which can be performed in parallel corresponds to the number of usable tape drives.

The control apparatus 201 utilizes the above characteristics of an export process and controls the order of processes by the tape drives for reading out data from a library magnetic tape and writing data to an export magnetic tape. By doing so, the control apparatus 201 enhances efficiency in an export process and reduces processing time.

Figure 4:
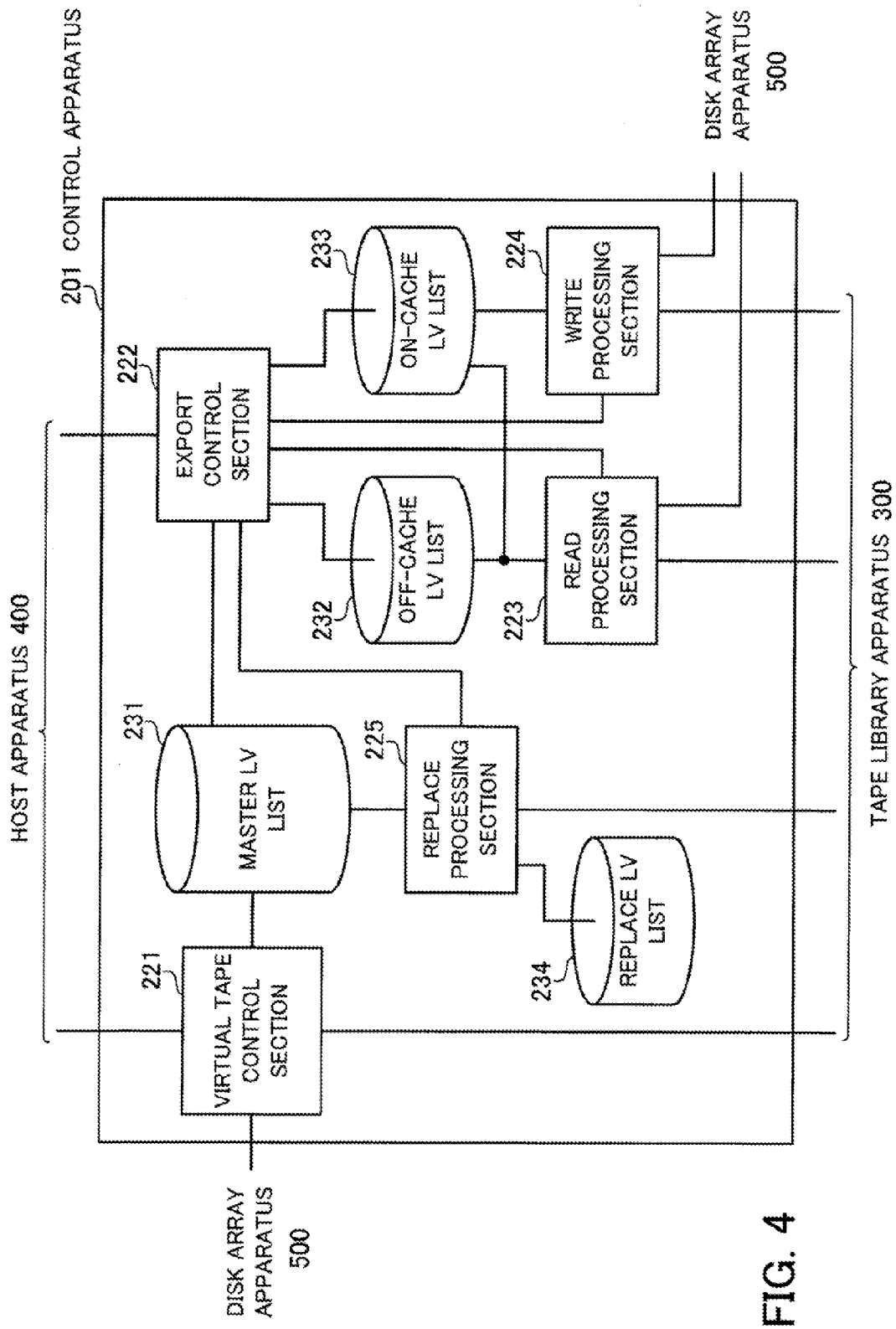
FIG. 4 is a block diagram of an example of processing functions which the control apparatus has.

FIG. 4 is a block diagram of an example of processing functions which the control apparatus has.

The control apparatus 201 includes a virtual tape control section 221, an export control section 222, a read processing section 223, a write processing section 224, and a replace processing section 225. For example, the CPU 211 of the control apparatus 201 executes determined firmware programs. By doing so, these processes are realized. In addition, a memory (flash memory 213, for example) included in the control apparatus 201 stores a master LV (Logical Volume) list 231, an off-cache LV list 232, an on-cache LV list 233, and a replace LV list 234.

In response to a request from the host apparatus 400 to access the virtual tape library system, the virtual tape control section 221 controls access to data in an HDD in the disk array apparatus 500, access to data on a magnetic tape in the tape library apparatus 300, transmitting data to and receiving data from the host apparatus 400, and the like. Furthermore, at this time the virtual tape control section 221 uses the master LV list 231 which stores information for managing a logical volume.

FIG. 5 is an example of information registered in the master LV list.

Records are generated in the master LV list 231 according to logical volumes. "LV name", "cache state", "store tape name", "LV size", "export start time", and "export frequency" are registered in a record of the master LV list 231 as information regarding a logical volume generated.

"LV name" is information for identifying a logical volume. "cache state" indicates whether the logical volume is in an on-cache state or an off-cache state. If the logical volume is in an on-cache state, then "cache state" is set to "on". If the logical volume is in an off-cache state, then "cache state" is set to "off". "store tape name" is information for identifying a library magnetic tape on which the logical volume is stored. "LV size" indicates the size of data in the logical volume.

"export start time" indicates time at which the last export process for the logical volume corresponding to the record was begun. "export frequency" indicates the total number of times an export process for the logical volume corresponding to the record was performed in the past. "export start time" and "export frequency" are registered and updated by the export control section 222 and are referred to by the replace processing section 225.

For example, the virtual tape control section 221 performs the following process by the use of the master LV list 231. When the virtual tape control section 221 generates a new logical volume in response to a request from the host apparatus 400 or the like, the virtual tape control section 221 generates a record corresponding to the generated logical volume in the master LV list 231. At this time the virtual tape control section 221 sets "cache state" in the record corresponding to the generated logical volume to "on", secures a new logical volume area in the disk array apparatus 500, and registers the size of the secured logical volume area in "LV size".

The virtual tape control section 221 then records data which the host apparatus 400 requests to write in the logical volume in the disk array apparatus 500. Furthermore, the virtual tape control section 221 later copies the logical volume in which the data is recorded to a determined library magnetic tape in the tape library apparatus 300 at determined timing. At this time the virtual tape control section 221 registers information indicative of the library magnetic tape to which the logical volume is copied in "store tape name" in the record corresponding to the logical volume.

In addition, for example, when free capacity of the disk array apparatus 500 becomes small, the virtual tape control section 221 erases a logical volume for which the longest time has elapsed after the last access time from the disk array apparatus 500. At this time the virtual tape control section 221 sets "cache state" in a record corresponding to the logical volume erased from the disk array apparatus 500 to "off".

Furthermore, when the virtual tape control section 221 receives from the host apparatus 400 a request to read out data, the virtual tape control section 221 determines on the basis of the master LV list 231 whether or not a logical volume containing the data is recorded in the disk array apparatus 500. For example, it is assumed that the host apparatus 400 requests to read out data contained in the logical volume "VT0001". If the logical volume "VT0001" containing the data is recorded in the disk array apparatus 500, "cache state" is "on" in a record of the master LV list 231 corresponding to the logical volume "VT0001". In this case, the virtual tape control section 221 reads out the data from the logical volume "VT0001" in the disk array apparatus 500 and transmits the data to the host apparatus 400.

On the other hand, if the logical volume "VT0001" containing the data is not recorded in the disk array apparatus 500, "cache state" is "off" in the record of the master LV list 231 corresponding to the logical volume "VT0001". In this case, the virtual tape control section 221 makes the tape library apparatus 300 mount a library magnetic tape on which the logical volume "VT0001" is stored on any tape drive. The virtual tape control section 221 then reads out the logical volume "VT0001" from the mounted library magnetic tape and copies the logical volume "VT0001" to the disk array apparatus 500. At this time the virtual tape control section 221 changes "cache state" from "off" to "on" in the record of the master LV list 231 corresponding to the logical volume "VT0001". After that, the virtual tape control section 221 reads out the data which the host apparatus 400 requests to read out from the logical volume "VT0001" copied to the disk array apparatus 500, and transmits the data to the host apparatus 400.

For example, one of "dirty", "hit", and "miss" may be registered as "cache state" in place of the above "on" or "off". "dirty" indicates a state in which latest data in a logical volume is stored in the disk array apparatus 500 and in which the latest data in the logical volume is not stored on a library magnetic tape. "hit" indicates a state in which data in a logical volume in the disk array apparatus 500 is the same as data in a logical volume on a library magnetic tape. "miss" indicates a state in which data in a logical volume is not recorded in the disk array apparatus 500 and in which the data in the logical volume is recorded only on a library magnetic tape.

It is assumed that these three states are used. If a logical volume is in an on-cache state, "cache state" in a record corresponding to the logical volume is "dirty" or "hit". On the other hand, if a logical volume is in an off-cache state, "cache state" in a record corresponding to the logical volume is "miss".

The following is description of FIG. 4. The export control section 222, the read processing section 223, and the write processing section 224 are processing functions related to performing an export process.

The export control section 222 controls an entire export process. When the export control section 222 accepts from the host apparatus 400 a request to perform an export process, the export control section 222 generates an off-cache LV list 232 and an on-cache LV list 233. As described later, information regarding logical volumes in an off-cache state of logical volumes designated by the host apparatus 400 as an export object is registered in the off-cache LV list 232. Information regarding logical volumes in an on-cache state of the logical volumes designated by the host apparatus 400 as an export object is registered in the on-cache LV list 233.

The export control section 222 adjusts the order in which records for logical volumes are registered in the off-cache LV list 232. By doing so, the export control section 222 controls the order in which the read processing section 223 reads from a library magnetic tape. Furthermore, the export control section 222 controls the number of tape drives used by the read processing section 223 and timing at which the write processing section 224 begins to write to a logical volume. By exercising this control, the export control section 222 controls the processes performed by the read processing section 223 and the write processing section 224 for the purpose of making time taken to perform an export process as short as possible.

On the basis of information registered in the off-cache LV list 232, the read processing section 223 performs an on-cache process under the control of the export control section 222 for copying a logical volume in an off-cache state from a library magnetic tape to the disk array apparatus 500. In addition, each time an on-cache process for a library magnetic tape terminates, the read processing section 223 moves a record of the off-cache LV list 232 corresponding to the library magnetic tape for which an on-cache process has terminated to the on-cache LV list 233.

On the basis of information registered in the on-cache LV list 233, the write processing section 224 reads out a logical volume in an on-cache state from the disk array apparatus 500 and writes the logical volume to an export magnetic tape, under the control of the export control section 222.

On the basis of an export process history, the replace processing section 225 controls the tape library apparatus 300 to perform a "replace process". The replace process is as follows. If it is expected that export processes for logical volumes will be performed in the same period, then a place in the tape library apparatus 300 where a logical volume is stored is changed in order to store the logical volumes on the same library magnetic tape.

Each time an export process terminates, the replace processing section 225 registers information regarding a logical volume which is an object of a replace process in the replace LV list 234. The replace processing section 225 then performs a replace process on the basis of the replace LV list 234 in a period (nighttime, for example) in which an export process is not performed (outside business hours).

FIG. 6 is an example of information registered in the off-cache LV list.

Information regarding a logical volume in an off-cache state is registered in the off-cache LV list 232. "LV name" for identifying a logical volume, "store tape name" for identifying a library magnetic tape on which the logical volume is stored, and "LV size" indicative of the size of the logical volume are registered as information regarding the logical volume.

The export control section 222 first generates records in the off-cache LV list 232 according to logical volumes in an off-cache state. The export control section 222 then combines records in which library magnetic tapes indicated by "store tape name" are the same. In FIG. 6, for example, the logical volumes "VT0002", "VT0004", and "VT0008" are stored on the same library magnetic tape. Accordingly, records corresponding to the logical volumes "VT0002", "VT0004", and "VT0008" are combined. Records which are combined will be referred to as a "combined record". In addition, the export control section 222 sorts combined records in descending order of total size of data in logical volumes of combined record.

FIG. 7 is an example of information registered in the on-cache LV list.

Records are generated in the on-cache LV list 233 according to logical volumes. Items registered in the on-cache LV list 233 are the same as those registered in the off-cache LV list 232.

In this embodiment items registered in the on-cache LV list 233 are the same as those registered in the off-cache LV list 232 so that the read processing section 223 can move a record in the off-cache LV list 232 to the on-cache LV list 233 in its original condition. However, "store tape name" may not be registered in the on-cache LV list 233.

Figure 8:
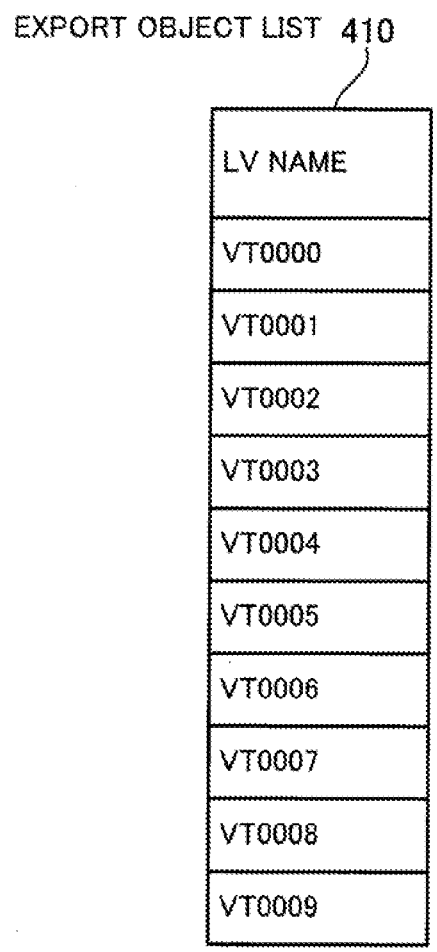
FIG. 8 is an example of the data structure of an export object list transmitted by a host apparatus.

A procedure for an export process in the control apparatus 201 will now be described. FIG. 8 is an example of the data structure of an export object list transmitted by the host apparatus.

When the host apparatus 400 requests the control apparatus 201 or 202 to perform an export process, the host apparatus 400 transmits, for example, an export object list 410 like that indicated in FIG. 8 in which "LV names" for identifying logical volumes that are export objects are enumerated to the control apparatus 201 or 202.

Figure 9:
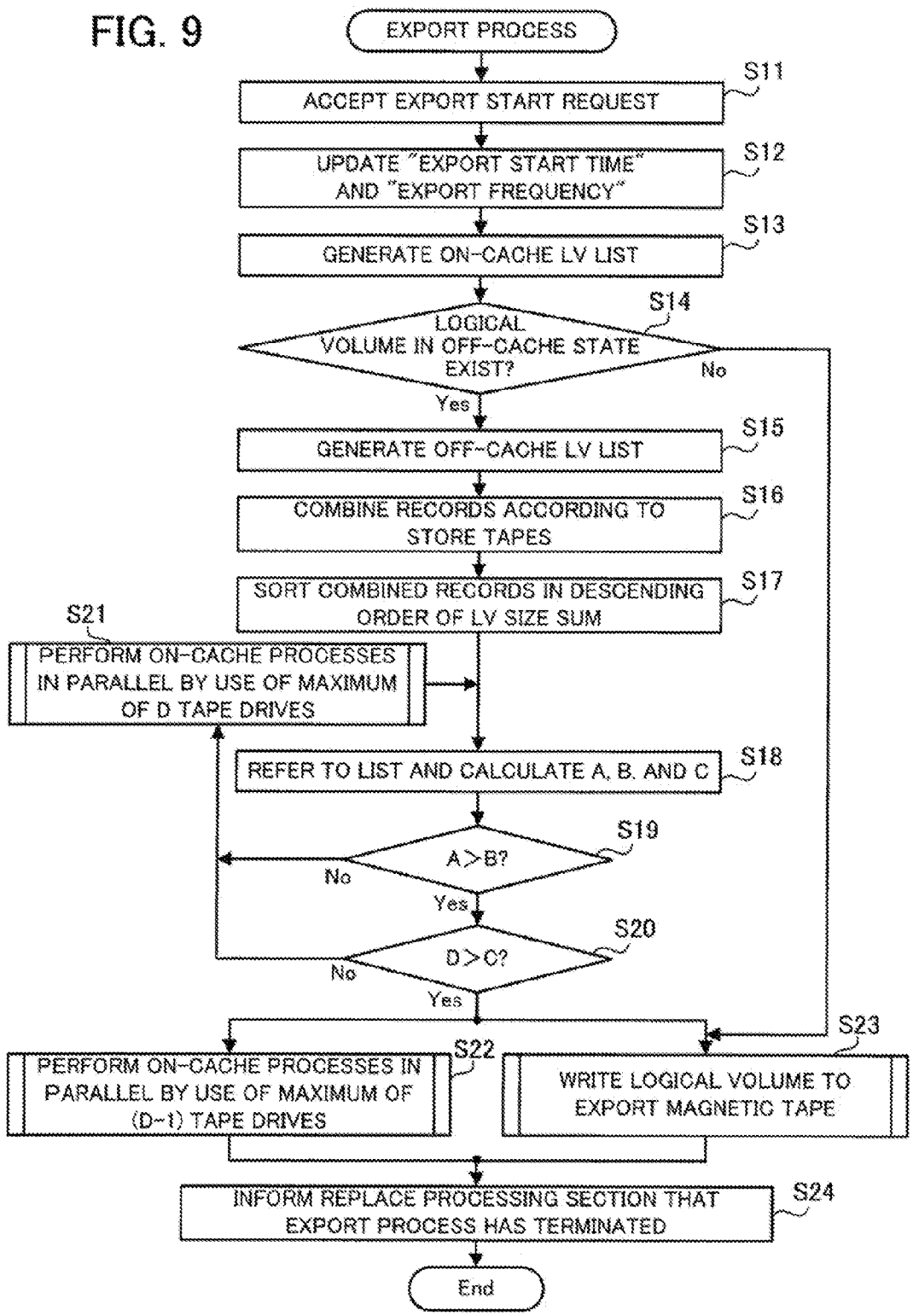
FIG. 9 is a flow chart of an example of a procedure for an entire export process.

FIG. 9 is a flow chart of an example of a procedure for an entire export process.

(Step S11) The export control section 222 accepts from the host apparatus 400 a request to perform an export process and the designation of logical volumes as an export object. The logical volumes which are designated as an export object by, for example, the export object list 410 indicated in FIG. 8.

(Step S12) The export control section 222 selects from the master LV list 231 all records for the logical volumes which are designated by the host apparatus 400 as an export object. The export control section 222 changes the value of "export start time" in each record selected to the present time. In addition, the export control section 222 increments the value of "export frequency" in each record selected by "1".

The update of "export start time" and "export frequency" may be performed, for example, each time the write processing section 224 writes a logical volume to an export magnetic tape in step S23 described later.

(Step S13) The export control section 222 generates an on-cache LV list 233. To be concrete, the export control section 222 refers to the master LV list 231 and selects logical volumes for which "cache state" is "on" (that is to say, logical volumes in an on-cache state) of the logical volumes which are designated by the host apparatus 400 as an export object. The export control section 222 registers records for the selected logical volumes in the on-cache LV list 233. At this time the export control section 222 reads out information regarding "LV name", "store tape name", and "LV size" for the selected logical volumes from the master LV list 231 and registers the information in corresponding records of the on-cache LV list 233.

(Step S14) The export control section 222 refers to the master LV list 231 and determines whether or not, among the logical volumes which are designated by the host apparatus 400 as an export object, there is a logical volume for which "cache state" is "off" (that is to say, a logical volume in an off-cache state). If there is a logical volume in an off-cache state (Yes in S14), then the export control section 222 proceeds to step S15. On the other hand, if there is no logical volume in an off-cache state (No in S14), then the export control section 222 proceeds to step S23.

(Step S15) The export control section 222 generates an off-cache LV list 232. To be concrete, the export control section 222 refers to the master LV list 231 and selects logical volumes for which "cache state" is "off" (that is to say, logical volumes in an off-cache state) of the logical volumes which are designated by the host apparatus 400 as an export object. The export control section 222 registers records for the selected logical volumes in the off-cache LV list 232. At this time the export control section 222 reads out information regarding "LV name", "store tape name", and "LV size" for the selected logical volumes from the master LV list 231 and registers the information in corresponding records of the off-cache LV list 232.

(Step S16) The export control section 222 combines records, of the record registered in the off-cache LV list 232, for which library magnetic tapes indicated by "store tape name" are the same.

(Step S17) The export control section 222 adds up values of "LV size" registered in each combined record obtained in step S16 to calculate LV size sums according to combined records. The export control section 222 sorts the combined records in the off-cache LV list 232 in descending order of LV size sum.

The order in which step S13 and steps S15 through S17 are performed may be reversed. Furthermore, step S13 and steps S15 through S17 may be performed in parallel.

(Step S18) The export control section 222 adds up all values of "LV size" registered in the on-cache LV list 233 to calculate the total size A of data in the logical volumes in an on-cache state.

In addition, the export control section 222 adds up all values of "LV size" registered in the off-cache LV list 232 to calculate the total size B of data in the logical volumes in an off-cache state.

Furthermore, the export control section 222 counts the number of the combined records registered in the off-cache LV list 232 and calculates the number C of library magnetic tapes on which the logical volumes in an off-cache state are stored.

(Step S19) The export control section 222 determines whether or not the condition A>B is met. If the condition A>B is met (Yes in S19), then the export control section 222 proceeds to step S20. If the condition A>B is not met (No in S19), then the export control section 222 proceeds to step S21.

(Step S20) It is assumed that the number of tape drives included in the tape library apparatus 300 is D. This number D is a value determined in advance, and is stored in advance in, for example, the flash memory 213 of the control apparatus 201. In the example of FIG. 3, the number D is "4".

The export control section 222 determines whether or not the condition D>C is met. If the condition D>C is met (Yes in S20), then the export control section 222 proceeds to steps S22 and S23. If the condition D>C is not met (No in S20), then the export control section 222 proceeds to step S21.

(Step S21) If the condition is not met in step S19 (No in step S19) or the condition is not met in step S20 (No in step S20), then the export control section 222 sets the number of usable tape drives to D for the read processing section 223 and makes the read processing section 223 perform on-cache processes in parallel by the use of a maximum of D tape drives.

As described later, the read processing section 223 controls the tape library apparatus 300 and reads out a logical volume which is an export object from a library magnetic tape corresponding to a combined record registered in the off-cache LV list 232. At this time the read processing section 223 uses tape drives the number of which does not exceed the number of usable tape drives set by the export control section 222, and reads out logical volumes in parallel from library magnetic tapes. In step S21, the number of usable tape drives is D ("4" in this embodiment). Accordingly, if D or more combined records are registered in the off-cache LV list 232, then logical volumes are read out by the use of all of the tape drives included in the tape library apparatus 300. The read processing section 223 stores the logical volumes read out from the library magnetic tapes in an HDD of the disk array apparatus 500.

Steps S18 and S19 by the export control section 222 are repeated, for example, every constant period until the export control section 222 determines both in step S19 and in step S20 that the condition is met (Yes in S19 and Yes in S20). Alternatively, steps S18 and S19 may be performed each time reading out a logical volume from one library magnetic tape terminates. In this case, steps S18 and S19 are repeated until the export control section 222 determines both in step S19 and in step S20 that the condition is met (Yes in S19 and Yes in S20). As a result, the tape library apparatus 300 reads out logical volumes from library magnetic tapes by the use of a maximum of D tape drives until the export control section 222 determines both in step S19 and in step S20 that the condition is met (Yes in S19 and Yes in S20).

In addition, as described later, each time reading out from a library magnetic tape terminates, the read processing section 223 moves a combined record corresponding to the library magnetic tape from the off-cache LV list 232 to the on-cache LV list 233. By doing so, the following situation arises in step S18. With the elapse of time, the total size A of data in logical volumes in an on-cache state increases, and the total size B of data in logical volumes in an off-cache state and the number C of library magnetic tapes on which the logical volumes in an off-cache state are stored decrease. A state in which the condition A>B and the condition D>C are met arises at some point of time. The export control section 222 determines in step S19 that the condition A>B is met (Yes in S19), and determines in step S20 that the condition D>C is met (Yes in S20). Steps S22 and S23 are then performed.

(Step S22) If the condition is met both in step S19 and in step S20 (Yes in S19 and Yes in S20), then the export control section 222 sets the number of usable tape drives to (D−1) for the read processing section 223 and makes the read processing section 223 perform on-cache processes in parallel by the use of a maximum of (D−1) tape drives.

(Step S23) If the condition is met both in step S19 and in step S20 (Yes in S19 and Yes in S20) or if there is no logical volume in an off-cache state in step S14 (No in S14), then the export control section 222 requests the write processing section 224 to begin writing a logical volume to an export magnetic tape by the use of one tape drive.

When step S22 is performed, at least one tape drive is secured in the tape library apparatus 300 as an idle drive which does not perform an on-cache process. In this case, in step S23 the tape library apparatus 300 mounts the export magnetic tape on one of tape drives secured as idle drives under the control of the write processing section 224. The tape library apparatus 300 then writes a logical volume read out from the disk array apparatus 500 to the mounted export magnetic tape.

(Step S24) When writing all the logical volumes designated as an export object to the export magnetic tape terminates, the export control section 222 informs the replace processing section 225 that the export process has terminated. At this time the export control section 222 informs the replace processing section 225 about "LV names" indicative of logical volumes the writing of which has terminated.

Figure 10:
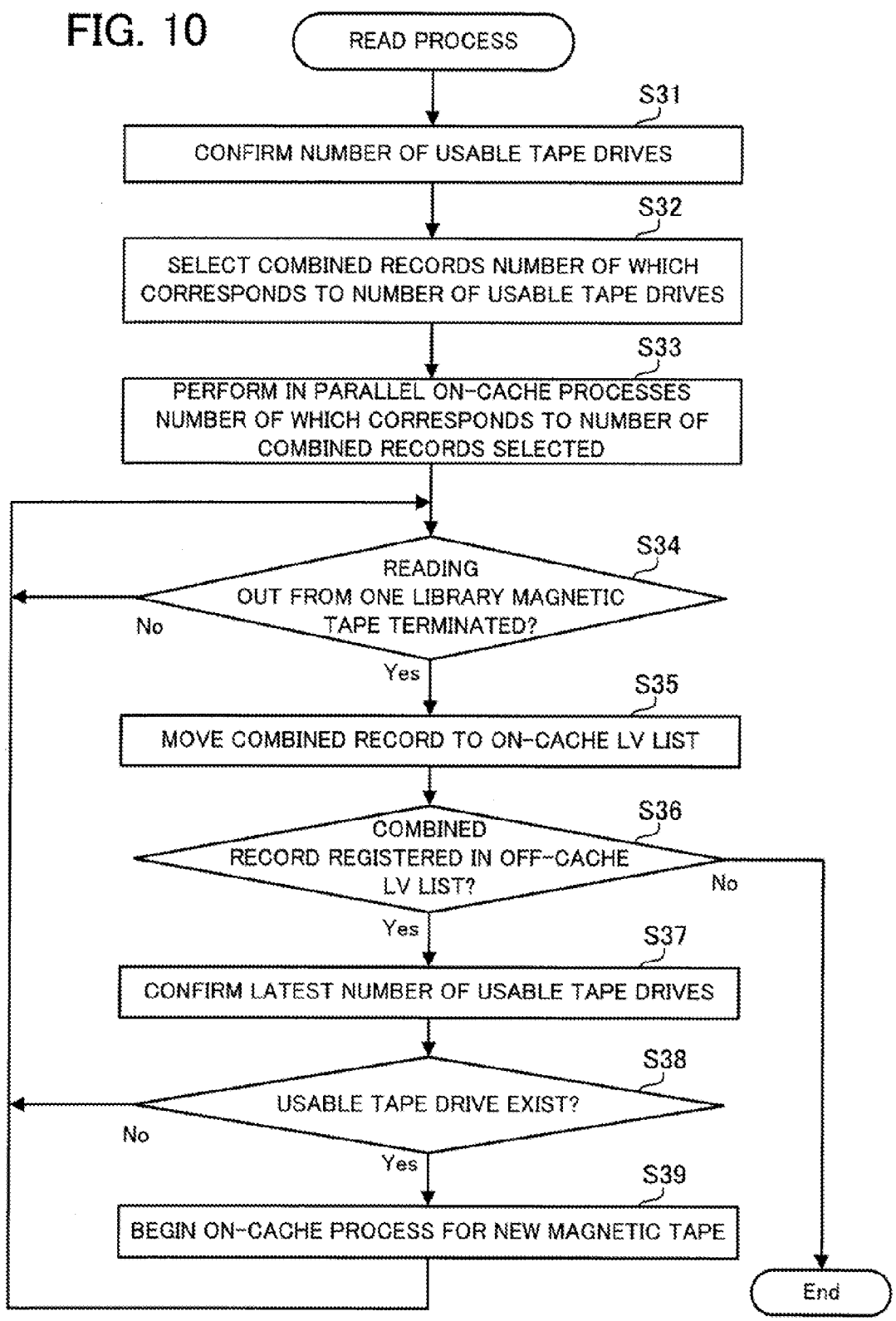
FIG. 10 is a flow chart of an example of a procedure for a process performed by a read processing section.

FIG. 10 is a flow chart of an example of a procedure for a process performed by the read processing section. A process indicated in FIG. 10 corresponds to the operations performed by the read processing section in steps S21 and S22 of FIG. 9.

(Step S31) The read processing section 223 confirms the number of usable tape drives set by the export control section 222. After step S19 of FIG. 9 is performed first, the export control section 222 sets the number of usable tape drives for the read processing section 223 in step S21 or S22. In step S31, this number is confirmed. Accordingly, the number of usable tape drives is D or (D−1).

(Step S32) The read processing section 223 selects combined records the number of which corresponds to the number of usable tape drives confirmed in step S31 from the off-cache LV list 232 in order from the top. If the number of combined records registered in the off-cache LV list 232 is smaller than the number of usable tape drives, then the read processing section 223 selects all the combined records registered.

(Step S33) The read processing section 223 performs in parallel on-cache processes the number of which corresponds to the number of the combined records selected in step S32.

First the read processing section 223 assigns tape drives of the tape library apparatus 300 to the combined records selected in step S32. The read processing section 223 controls the tape library apparatus 300 to mount library magnetic tapes indicated by "store tape names" registered in the corresponding combined records on the assigned tape drives. The read processing section 223 reads out logical volumes indicated by all "LV names" registered in the corresponding combined records from the library magnetic tapes, and stores the logical volumes in an HDD of the disk array apparatus 500. If a plurality of combined records are selected in step S32, tape drives the number of which corresponds to the number of the combined records selected are used for reading out data in parallel.

(Step S34) The process of reading out a logical volume is performed in the tape library apparatus 300. The read processing section 223 waits until reading out from one of the library magnetic tapes terminates (No in S34). When reading out from one library magnetic tape terminates (Yes in S34), the read processing section 223 proceeds to step S35.

(Step S35) The read processing section 223 moves a combined record corresponding to the library magnetic tape from which reading out terminates in step S34 from the off-cache LV list 232 to the on-cache LV list 233.

(Step S36) The read processing section 223 determines whether or not a combined record is registered in the off-cache LV list 232. If a combined record is registered in the off-cache LV list 232 (Yes in S36), then the read processing section 223 proceeds to step S37. On the other hand, if a combined record is not registered in the off-cache LV list 232 (No in S36), then all of logical volumes which are export objects have been stored in the disk array apparatus 500. The read processing section 223 terminates the process.

(Step S37) The read processing section 223 confirms the latest number of usable tape drives set by the export control section 222.

(Step S38) The read processing section 223 determines whether or not among the tape drives included in the tape library apparatus 300, there is an idle tape drive which can be used for performing an on-cache process. If the number of tape drives currently used for performing an on-cache process is smaller than the number of usable tape drives confirmed in step S37, then the read processing section 223 determines that there is an idle tape drive.

If the read processing section 223 determines that there is an idle tape drive (Yes in S38), then the read processing section 223 proceeds to step S39. On the other hand, if the read processing section 223 determines that there is no idle tape drive (No in S38), then the read processing section 223 returns to step S34 and waits until reading out from one of library magnetic tapes terminates.

For example, if the determination that the condition is met is made in steps S19 and S20 (Yes in step S19 and Yes in step S20) after step S21 of FIG. 9 and step S22 is performed, the number of tape drives which can be used for performing an on-cache process decreases from D to (D−1). In this case, the determination that there is no idle tape drive is made in step S38 until reading out from another library magnetic tape terminates.

(Step S39) The read processing section 223 selects a leading combined record from among remaining combined records registered in the off-cache LV list 232, and begins to perform an on-cache process for the selected combined record. After that, the read processing section 223 returns to step S34.

In step S39 the read processing section 223 controls the tape library apparatus 300 to mount a library magnetic tape indicated by "store tape name" in the selected combined record on the idle tape drive. The read processing section 223 then reads out logical volumes indicated by all "LV names" registered in the selected combined record from the library magnetic tape mounted on the idle tape drive, and stores the logical volumes in an HDD of the disk array apparatus 500.

With the above process indicated in FIG. 10, the read processing section 223 selects combined records in the order in which they are registered in the off-cache LV list 232, reads out logical volumes which are export objects from library magnetic tapes corresponding to the selected combined records, and stores the logical volumes in HDDs of the disk array apparatus 500. At this time the read processing section 223 uses a necessary number of tape drives of usable tape drives the number of which is set by the export control section 222 for reading out in parallel logical volumes which are export objects. The read processing section 223 uses a necessary number of tape drives of all the tape drives included in the tape library apparatus 300 for reading out logical volumes, particularly in a period in which the condition (A>B and D>C) is not met. By doing so, time taken to perform an on-cache process for logical volumes which are export objects is reduced.

Figure 11:
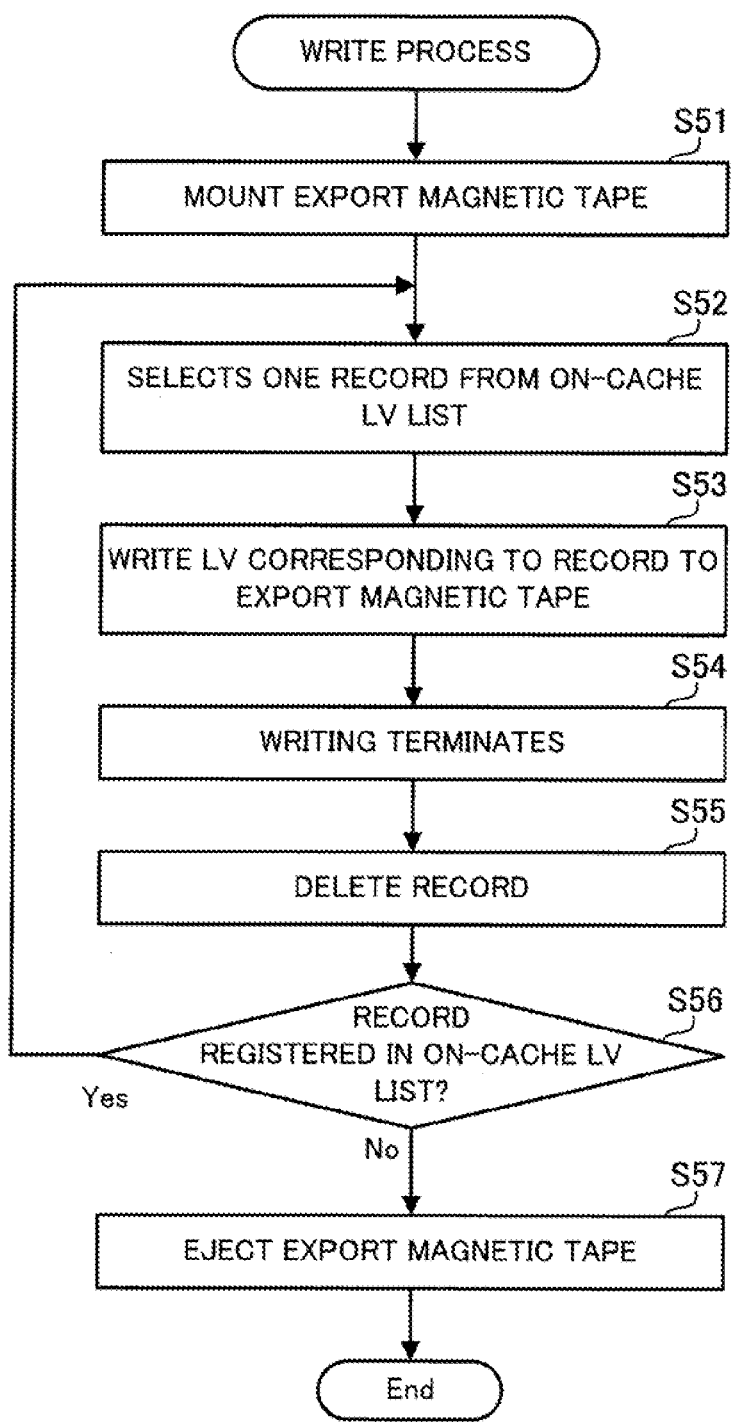
FIG. 11 is a flow chart of an example of a procedure for a process performed by a write processing section.

FIG. 11 is a flow chart of an example of a procedure for a process performed by the write processing section. A process indicated in FIG. 11 corresponds to the operations performed by the write processing section 224 in step S23 of FIG. 9.

(Step S51) The write processing section 224 controls the tape library apparatus 300 to mount an export magnetic tape on an idle tape drive of the tape drives in the tape library apparatus 300 which is not used for performing an on-cache process.

(Step S52) The write processing section 224 selects a record from the on-cache LV list 233. (Step S53) The write processing section 224 reads out a logical volume indicated by "LV name" in the record selected in step S52 from the disk array apparatus 500, and writes the logical volume to the export magnetic tape mounted on the idle tape drive in step S51.

(Step S54) When writing the logical volume to the export magnetic tape which the write processing section 224 begins in step 53 terminates, the write processing section 224 proceeds to step S55.

(Step S55) The write processing section 224 deletes the record selected in step S52 from the on-cache LV list 233.

(Step S56) The write processing section 224 determines whether or not a record is registered in the on-cache LV list 233. If a record is registered in the on-cache LV list 233 (Yes in step S56), then the write processing section 224 returns to step S52 and selects another record registered in the on-cache LV list 233. On the other hand, if a record is not registered in the on-cache LV list 233 (No in step S56), then all logical volumes which are export objects have been written. In this case, the write processing section 224 proceeds to step S57.

(Step S57) The write processing section 224 unmounts the export magnetic tape from the tape drive and ejects the export magnetic tape from the tape insertion and ejection opening 323.

Figure 12:
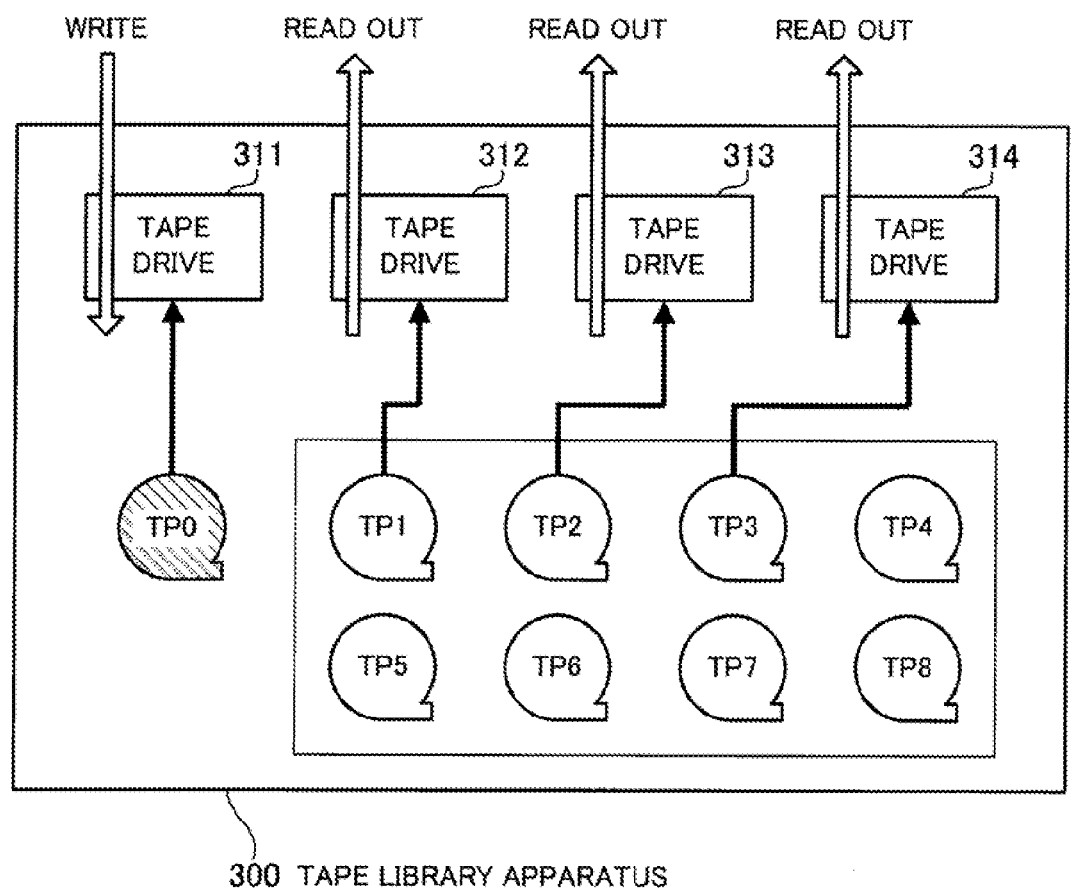
FIG. 12 is an example of the operation of the tape library apparatus at the time of an export process (part 1)

FIG. 12 is an example of the operation of the tape library apparatus at the time of an export process (part 1). The condition (A>B and D>C) will be described by the use of FIG. 12.

In FIG. 12, a magnetic tape TP0 is an export magnetic tape. In addition, magnetic tapes TP1, TP2, TP3, and so on are library magnetic tapes on which logical volumes in an off-cache state of logical volumes which are export objects are stored.

First it is assumed that a plurality of tape drives are used for performing writing to the export magnetic tape and reading out from a library magnetic tape in parallel. In this case, processing time can be made the shortest in the following way. Once the write processing section 224 begins writing to the export magnetic tape, the write processing section 224 continues writing to the export magnetic tape to the end without unmounting the export magnetic tape from a tape drive. In order to realize such a process, control is exercised to prevent writing to the export magnetic tape from being completed earlier than reading out from the library magnetic tapes.

It is assumed that each tape drive in the tape library apparatus 300 reads out from and writes to a magnetic tape at the same speed. In this case, an essential condition for preventing writing to the export magnetic tape from being completed earlier than reading out from the library magnetic tapes is as follows. The total size A of data in logical volumes in an on-cache state of logical volumes which are export objects is larger than the total size B of data in logical volumes in an off-cache state of the logical volumes which are export objects (A>B).

However, even if the condition A>B is met, there are cases where logical volumes in an off-cache state are distributed among many library magnetic tapes. In such cases, it may be necessary to replace a library magnetic tape at the time of performing an on-cache process.

FIG. 12 is an example of such a state. The number (eight in the example of FIG. 12) of library magnetic tapes on which logical volumes in an off-cache state are stored is larger than the number D (four in the example of FIG. 12) of tape drives included in the tape library apparatus 300. If one tape drive (tape drive 311 in the example of FIG. 12) is assigned in this state for writing to the export magnetic tape, a library magnetic tape is replaced at least once on each of the remaining (D−1) tape drives (tape drives 312 through 314 in the example of FIG. 12).

In FIG. 12, for example, when reading out a logical volume from the library magnetic tape TP1 terminates, the library magnetic tape TP1 is unmounted from the tape drive 312. Another library magnetic tape (library magnetic tape TP4, for example) is then mounted on the tape drive 312 and reading out a logical volume from the library magnetic tape mounted is begun.

If a library magnetic tape is replaced in this way, writing to an export magnetic tape may be completed before an on-cache process for all logical volumes in an off-cache state is completed. Therefore, even if the condition A>B is met, writing to the export magnetic tape is not begun in step S19 of FIG. 9 until the condition that the number C of library magnetic tapes on which logical volumes in an off-cache state are stored is smaller than the number D of tape drives (D>C) is met. The on-cache process is performed preferentially (step S21). By doing so, time taken to perform an entire export process can be reduced.

Figure 13:
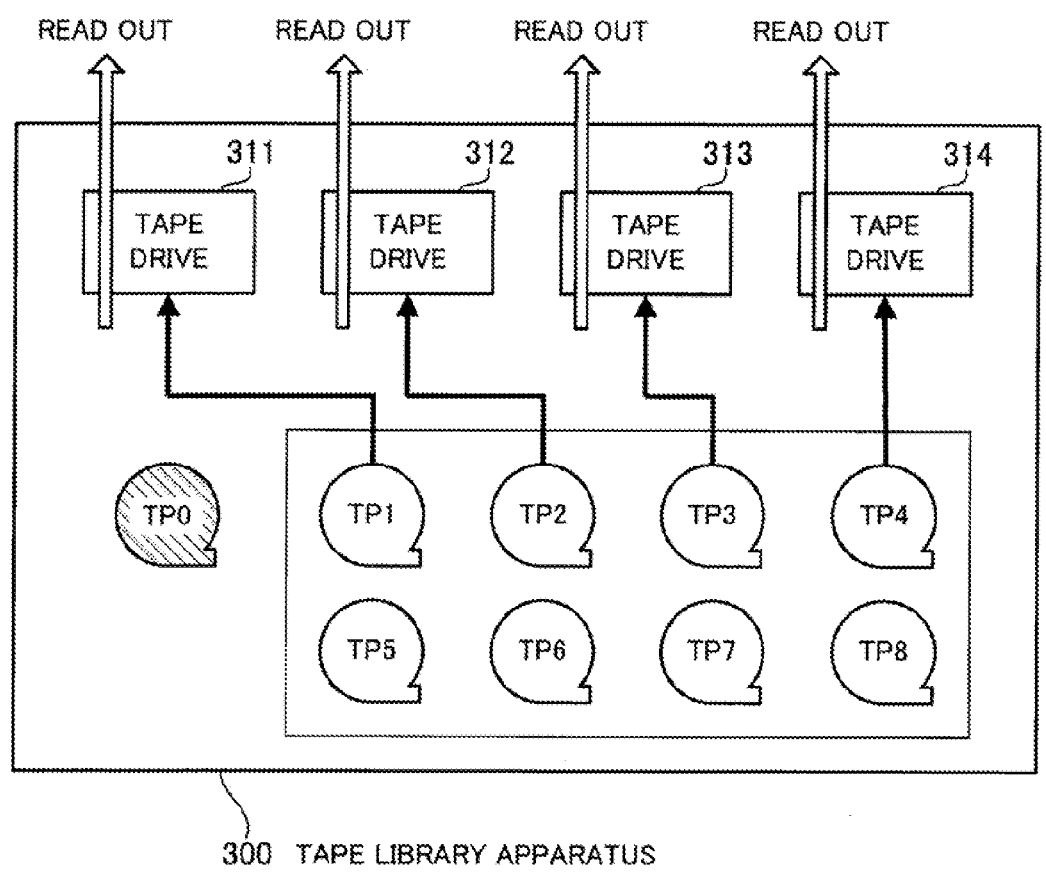
FIG. 13 is an example of the operation of the tape library apparatus at the time of an export process (part 2)

FIG. 13 is an example of the operation of the tape library apparatus at the time of an export process (part 2). In FIG. 13, a magnetic tape TP0 is an export magnetic tape. In addition, magnetic tapes TP1, TP2, TP3, and so on are library magnetic tapes on which logical volumes in an off-cache state of logical volumes which are export objects are stored. This is the same in FIG. 12.

If both of the conditions A>B and D>C are not met in step S21 of FIG. 9, then writing to an export magnetic tape is not begun. At this time all tape drives included in the tape library apparatus 300 can be used for performing an on-cache process. Accordingly, as illustrated in FIG. 13, the export control section 222 uses a necessary number of tape drives of all the tape drives included in the tape library apparatus 300 for reading out from library magnetic tapes in parallel (step S21). In the example of FIG. 13, a state in which library magnetic tapes are mounted on all tape drives 311 through 314 included in the tape library apparatus 300 and in which logical volumes are read out in parallel from the mounted library magnetic tapes is illustrated. By doing so, time which elapses before the beginning of writing to the export magnetic tape can be reduced.

In the off-cache LV list 232 combined records are sorted in step S17 in descending order of total size of logical volumes which are export objects and which are stored on library magnetic tapes. Accordingly, in step S21, a library magnetic tape which stores a larger amount of data to be read out is mounted preferentially on a tape drive and the data is read out.

The order of reading out from library magnetic tapes is determined in this way. As a result, the number of times a library magnetic tape is replaced before the satisfaction of the condition (A>B and D>C) is reduced. Accordingly, time which elapses before the beginning of writing a logical volume to the export magnetic tape is reduced. As a result, time taken to perform an entire export process can be reduced.

In addition, in the process of FIG. 9 the condition (A>B and D>C) is met (Yes in S19 and Yes in S20) and, excluding a tape drive assigned to the export magnetic tape, a necessary number of tape drives of (D−1) tape drives are then used for performing on-cache processes in parallel (step S22). By doing so, time taken to perform an on-cache process is reduced and the possibility that writing to the export magnetic tape is completed earlier than the on-cache process decreases. As a result, time taken to perform the entire export process can be reduced.

Figure 14:
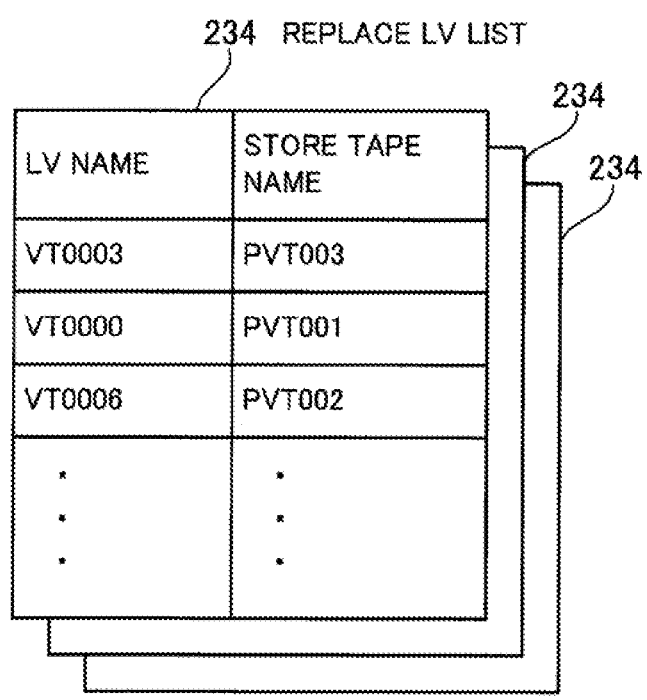
FIG. 14 is an example of information registered in a replace LV list.

A process performed by the replace processing section 225 will now be described. FIG. 14 is an example of information registered in the replace LV list.

A plurality of replace LV lists 234 may be registered by the replace processing section 225. Information regarding logical volumes which preferably are stored on one library magnetic tape by a replace process is registered in one replace LV list 234. "LV name" for identifying a logical volume and "store tape name" for identifying a library magnetic tape on which a logical volume is stored are registered according to logical volumes in each replace LV list 234.

On the basis of an export process history, the replace processing section 225 registers information regarding logical volumes which preferably are stored on one library magnetic tape in one replace LV list 234. For example, the possibility that logical volumes for which export processes were performed at approximately the same time or logical volumes for which export processes were performed approximately the same number of times, of logical volumes for which export processes were performed in the past, are designated at the same time in the future as export objects by the host apparatus 400 will be high. Accordingly, the replace processing section 225 registers information regarding the logical volumes for which export processes were performed at approximately the same time or the logical volumes for which export processes were performed approximately the same number of times in one replace LV list 234. The replace processing section 225 then moves logical volumes registered in one replace LV list 234 from library magnetic tapes on which they are stored to one library magnetic tape in a determined period, such as nighttime, in which an export process is not performed.

As stated above, "export start time" indicative of time at which the last export process for a logical volume was begun and "export frequency" indicative of the total number of times an export process for the logical volume was performed in the past are registered in the master LV list 231 as information regarding a history of an export process for the logical volume. Accordingly, the replace processing section 225 registers a replace LV list 234 only on the basis of information regarding an export process history registered in the master LV list 231.

Figure 15:
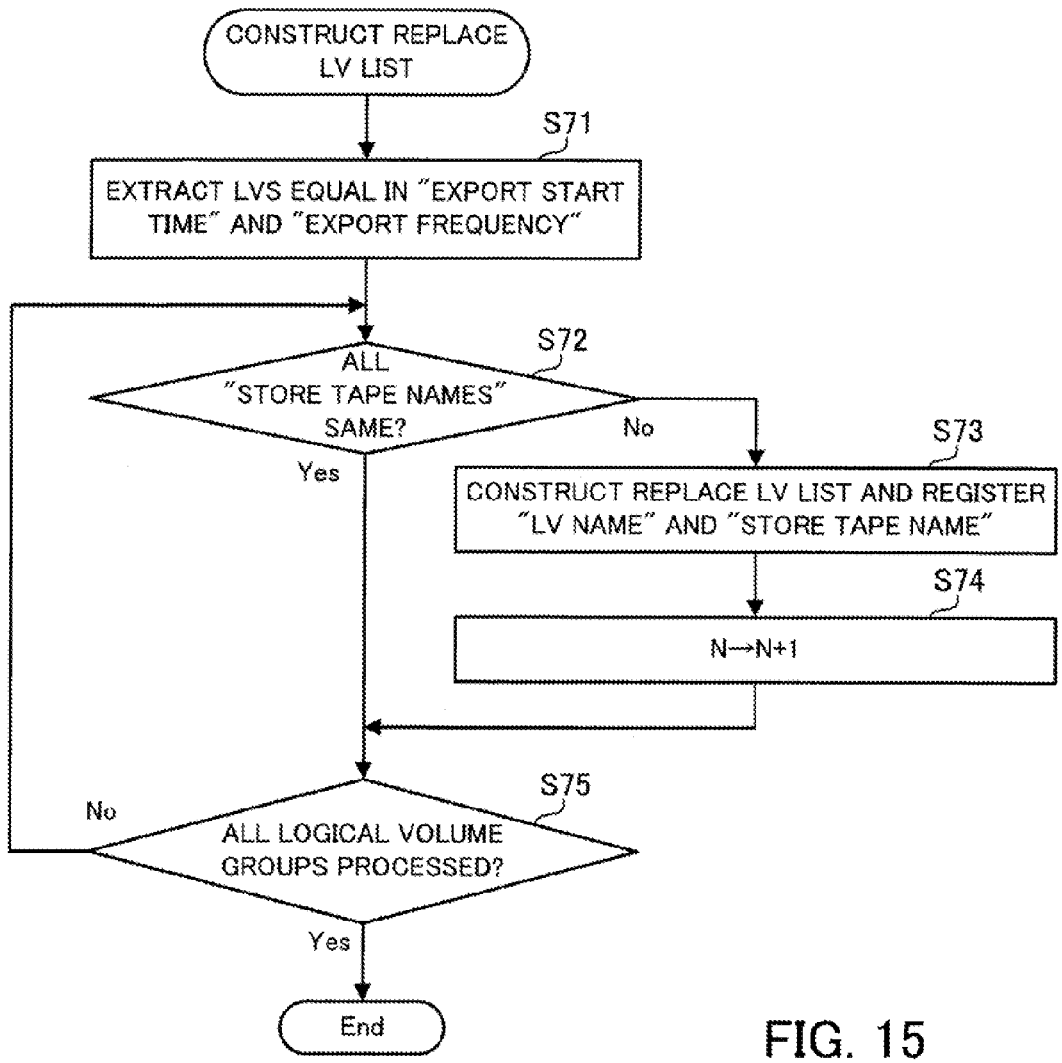
FIG. 15 is a flow chart of an example of a procedure for a replace LV list registration process.

FIG. 15 is a flow chart of an example of a procedure for a replace LV list registration process.

A process indicated in FIG. 15 is performed in a determined period, such as nighttime, in which an export process is not performed. In FIG. 15, "N" indicates the number of the replace LV lists 234 constructed by the replace processing section 225 and the initial value is set to "0". For example, when the control apparatus 201 is started, the replace processing section 225 stores the list number N in the flash memory 213 or the RAM 212 with the initial value as "0".

(Step S71) The replace processing section 225 extracts groups of logical volumes which are equal in "export start time" and "export frequency" from the master LV list 231.

In step S71 the replace processing section 225 may extract groups of logical volumes for which "export start time" is within a certain range (about several hours, for example) and for which "export frequency" is within a certain range (about several times, for example). Furthermore, the replace processing section 225 may extract groups of logical volumes which are equal only in "export start time" or for which only "export start time" is within a certain range. The replace processing section 225 may extract groups of logical volumes which are equal only in "export frequency" or for which only "export frequency" is within a certain range.

(Step S72) The replace processing section 225 selects one of the logical volume groups extracted in step S71. The replace processing section 225 reads out "store tape name" for each logical volume included in the selected logical volume group from the master LV list 231, and determines whether or not all "store tape names" read out are the same. If all "store tape names" read out are the same (Yes in S72), then the replace processing section 225 proceeds to step S75. On the other hand, if there is a logical volume which differs from the other logical volumes in "store tape name" (No is S72), then the replace processing section 225 proceeds to step S73.

(Step S73) The replace processing section 225 constructs one replace LV list 234 in the RAM 212 or the flash memory 213. The replace processing section 225 registers "LV name" and "store tape name" for each logical volume included in the logical volume group selected in step S72 in the constructed replace LV list 234.

(Step S74) The replace processing section 225 increments the list number N by "1".

(Step S75) The replace processing section 225 determines whether or not all the logical volume groups extracted in step S71 have been processed. If there is a logical volume group which is not yet processed (No in S75), then the replace processing section 225 returns to step S72 and selects the logical volume group which is not yet processed. On the other hand, if all the logical volume groups extracted in step S71 have been processed (Yes in S75), then the replace processing section 225 terminates the process.

Figure 16:
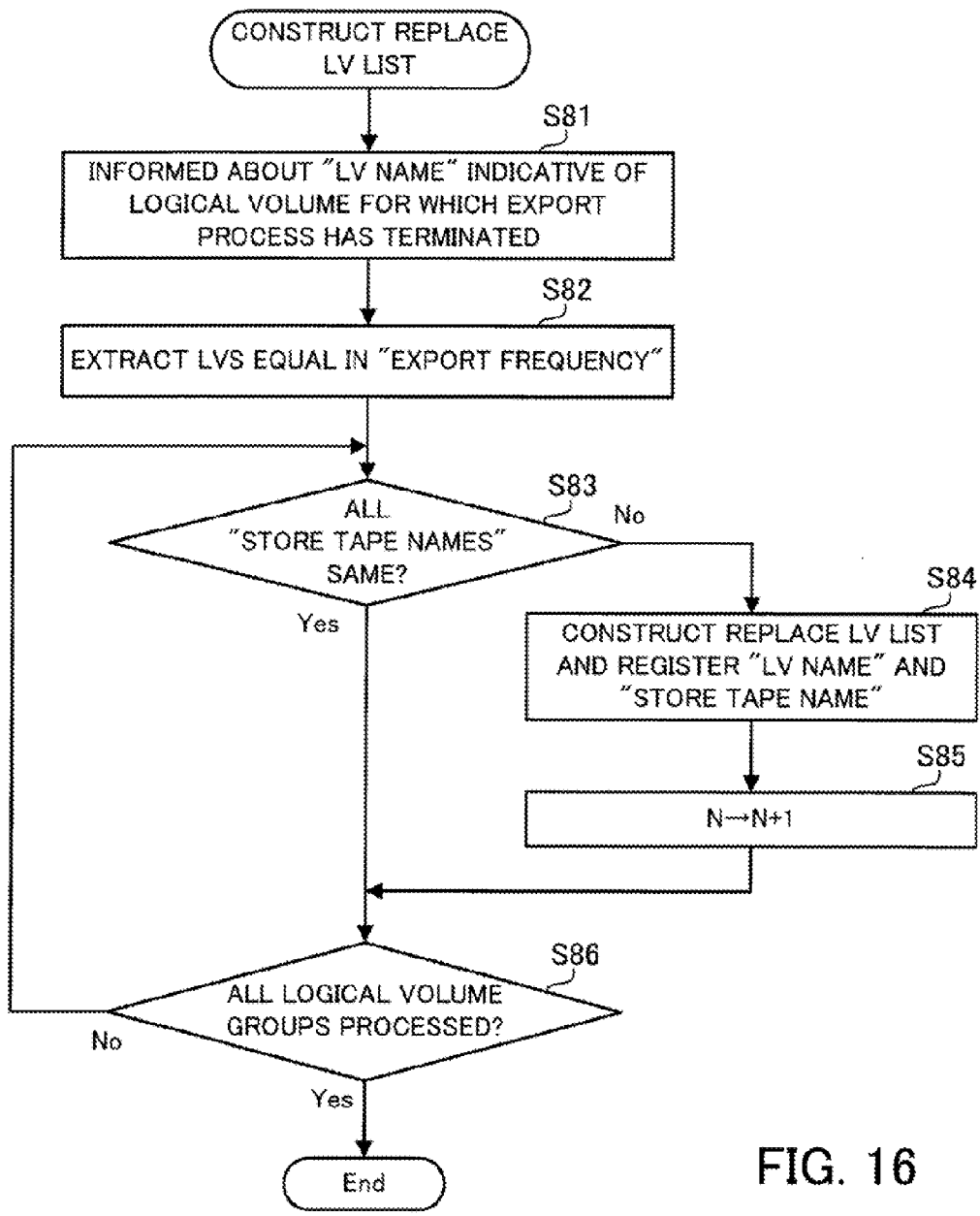
FIG. 16 is a flow chart of another example of a procedure for a replace LV list registration process.

In addition, the replace processing section 225 may construct a replace LV lists 234 by a method like that indicated in FIG. 16. If a plurality of logical volumes are designated by the host apparatus 400 as an export object and an export process for the plurality of logical volumes designated is performed, then there is a strong possibility that the plurality of logical volumes are simultaneously designated again in the future by the host apparatus 400 as an export object. Accordingly, with the process indicated in FIG. 16, the following method is adopted. At the time when an export process terminates, the replace processing section 225 registers information regarding a logical volume for which the export process has been performed in a replace LV lists 234.

FIG. 16 is a flow chart of another example of a procedure for a replace LV list registration process. The initial value of a list number N is "0". This is the same in FIG. 15.

(Step S81) In step S24 of FIG. 9 the export control section 222 informs the replace processing section 225 about "LV name" indicative of a logical volume for which an export process has terminated. The replace processing section 225 acquires "LV name" about which the export control section 222 informs the replace processing section 225.

(Step S82) The replace processing section 225 reads out "export frequency" corresponding to "LV name" about which the replace processing section 225 is informed in step S81 from the master LV list 231, and extracts groups of logical volumes which are equal in "export frequency". At this time the replace processing section 225 may extract groups of logical volumes for which "export frequency" is within a certain range.

(Step S83) The replace processing section 225 selects one of the logical volume groups extracted in step S82. The replace processing section 225 reads out "store tape name" for each logical volume included in the selected logical volume group from the master LV list 231, and determines whether or not all "store tape names" read out are the same. If all "store tape names" read out are the same (Yes in S83), then the replace processing section 225 proceeds to step S86. On the other hand, if there is a logical volume which differs from the other logical volumes in "store tape name" (No is S83), then the replace processing section 225 proceeds to step S84.

(Step S84) The replace processing section 225 constructs one replace LV list 234 in the RAM 212 or the flash memory 213. The replace processing section 225 registers "LV name" and "store tape name" for each logical volume included in the logical volume group selected in step S83 in the constructed replace LV list 234.

(Step S85) The replace processing section 225 increments the list number N by "1".

(Step S86) The replace processing section 225 determines whether or not all the logical volume groups extracted in step S82 have been processed. If there is a logical volume group which is not yet processed (No in S86), then the replace processing section 225 returns to step S83 and selects the logical volume group which is not yet processed. On the other hand, if all the logical volume groups extracted in step S82 have been processed (Yes in S86), then the replace processing section 225 terminates the process.

Figure 17:
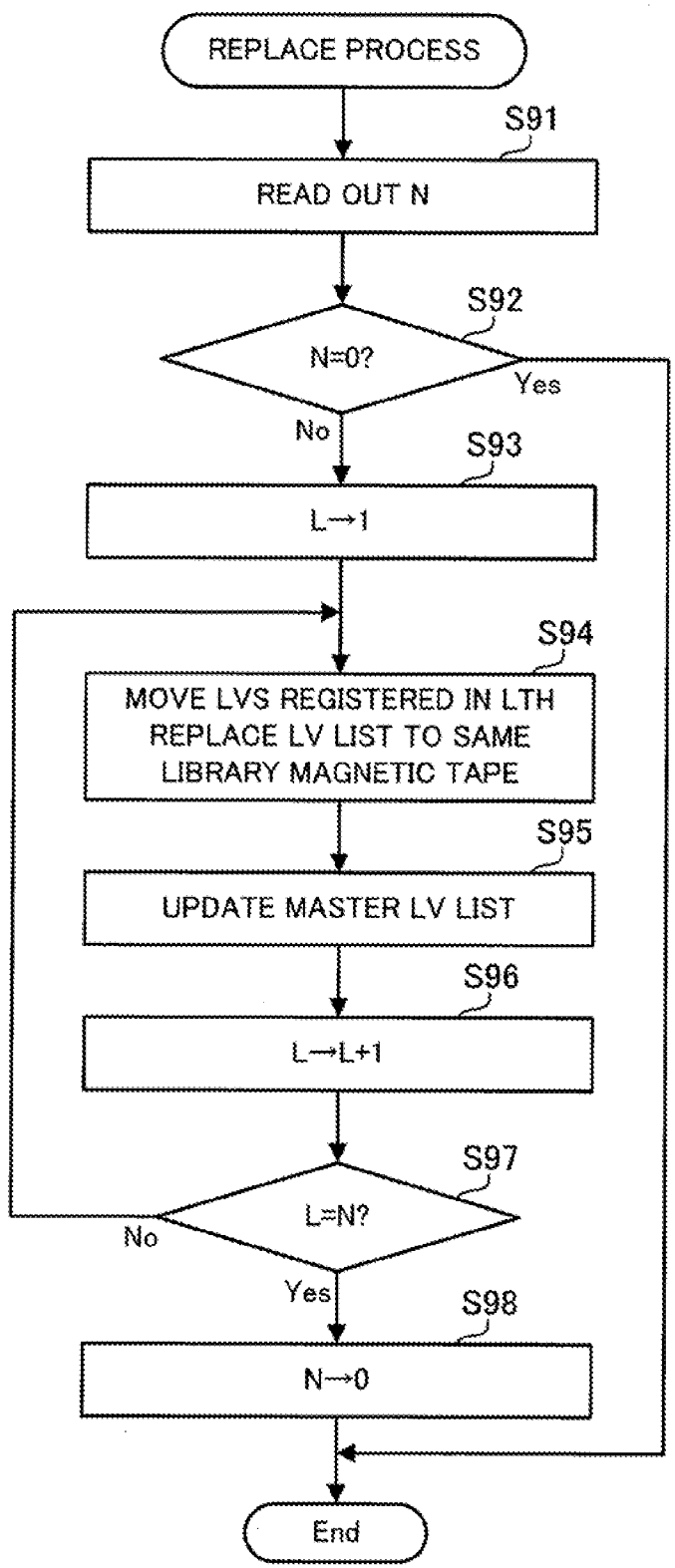
FIG. 17 is a flow chart of an example of a procedure for a replace process.

FIG. 17 is a flow chart of an example of a procedure for a replace process. A process indicated in FIG. 17 is performed in a determined period, such as nighttime, in which an export process is not performed.

(Step S91) The replace processing section 225 reads out the list number N from the RAM 212 or the flash memory 213.

(Step S92) The replace processing section 225 determines whether or not the list number N is "0". If the list number N is greater than or equal to "1" (No in S92), then the replace processing section 225 proceeds to step S93. On the other hand, if the list number N is "0" (Yes in S92), then the replace processing section 225 terminates the replace process.

(Step S93) The replace processing section 225 sets a variable L to "1".

(Step S94) The replace processing section 225 controls the tape library apparatus 300 to move logical volumes registered in an Lth replace LV list 234 to the same library magnetic tape.

To be concrete, the replace processing section 225 selects records in order from the Lth replace LV list 234. The replace processing section 225 mounts a library magnetic tape indicated by "store tape name" registered in a selected record on one of the tape drives included in the tape library apparatus 300. The replace processing section 225 reads out a logical volume indicated by "LV name" registered in the selected record from the mounted library magnetic tape, and stores the logical volume in an HDD of the disk array apparatus 500. At this time the replace processing section 225 makes the logical volume on the original library magnetic tape invalid.

When the replace processing section 225 stores all logical volumes registered in the Lth replace LV list 234 in HDDs of the disk array apparatus 500, the replace processing section 225 mounts a library magnetic tape to which each logical volume is to be moved on one of the tape drives included in the tape library apparatus 300. The replace processing section 225 stores each logical volume stored in an HDD of the disk array apparatus 500 on the mounted library magnetic tape to which each logical volume is to be moved.

(Step S95) The replace processing section 225 updates "store tape name", of information registered in the master LV list 231, for each logical volume for which a store is changed in step S94 so that "store tape name" will indicate the library magnetic tape to which each logical volume is moved in step S94.

(Step S96) The replace processing section 225 increments the variable L by "1".

(Step S97) The replace processing section 225 determines whether or not the value of the variable L is equal to the list number N. If the value of the variable L is smaller than the list number N (No in S97), then the replace processing section 225 returns to step S94. On the other hand, if the value of the variable L is equal to the list number N (Yes in S97), then the replace processing section 225 proceeds to step S98.

(Step S98) The replace processing section 225 initializes the list number N to "0".

Performing the above process indicated in FIG. 17 increases the possibility that when a request to perform an export process for a plurality of logical volumes designated is made later, the plurality of logical volumes designated are stored on the same library magnetic tape. Accordingly, time taken to perform the export process can be reduced.

According to the above storage system, storage control apparatus, and storage control method, writing external ejection object data to an external ejection record medium is hardly discontinued.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage control method by a storage control apparatus connected to a plurality of access devices which access a portable record medium and a storage apparatus which temporarily stores data recorded on a plurality of portable record mediums for controlling data transfer via the plurality of access devices between the plurality of portable record mediums and the storage apparatus, the method comprising:
accepting designation of export data that is to be written to a first portable record medium to be ejected,
dividing the designated export data into first export data and second export data, the first export data being already in the storage apparatus, the second export data being in the second portable record mediums, but not in the storage apparatus,
reading the second export data from the second portable record mediums into the storage apparatus,
detecting a current amount of the first export data in the storage apparatus and a current amount of the second export data still unread from the second portable record mediums, and
determining when to start writing the export data to the first portable record medium, based on the current amount of the first export data and the current amount of the second export data.

2. The storage control method according to claim 1, wherein the determining when to start writing the export data includes starting to write the export data to the first portable record medium when the current amount of the first export data exceeds the current amount of the second export data, and when the access devices outnumbers the second portable record mediums containing the second export data to be read.

3. The storage control method according to claim 2, wherein:
the reading the second export data uses all of the plurality of access devices when the current amount of the first export data is smaller than or equal to the current amount of the second export data, or when the access devices does not outnumber the second portable record mediums; and
the writing the export data to the first portable record medium is executed in parallel with the reading the second export data.

4. The storage control method according to claim 2, wherein the reading the second export data uses all unused access devices in parallel, when the current amount of the first export data exceeds the current amount of the second export data, and when the access devices outnumbers the second portable record mediums.

5. The storage control method according to claim 2, wherein the reading the second export data includes reading out data from the second portable record mediums in descending order of amount of the second export data stored therein.

6. The storage control method according to claim 1, wherein:
the reading the second export data uses all of the plurality of access devices when the current amount of the first export data is smaller than or equal to the current amount of the second export data; and
the writing the export data to the first portable record medium is executed in parallel with the reading the second export data, when the current amount of the first export data is larger than the current amount of the second export data.

7. The storage control method according to claim 1, wherein the reading the second export data uses all unused access devices in parallel, when the current amount of the first export data is larger than the current amount of the second export data.

8. The storage control method according to claim 1, the method further comprising:
- managing, for each dataset stored in the portable record mediums, a counter indicating how many times the dataset has been designated as export data, or a time record indicating when a latest designation as export data was made to the dataset;
- selecting one or more of the datasets whose corresponding counters indicate values smaller than a specified threshold, or whose corresponding time records fall in a specified time range; and
- moving the selected datasets to one portable record medium.

9. A storage system comprising:
- a plurality of access devices which access a portable record medium;
- a transport device which transports a plurality of portable record mediums between a storage location thereof and the plurality of access devices;
- a storage apparatus which temporarily stores data; and
- a control apparatus which controls data transfer via the plurality of access devices between a portable record medium and the storage apparatus,
- wherein the control apparatus includes a processor configured to perform a procedure including:
    - accepting designation of export data that is to be written to a first portable record medium to be ejected,
    - dividing the designated export data into first export data and second export data, the first export data being already in the storage apparatus, the second export data being in the second portable record mediums, but not in the storage apparatus,
    - reading the second export data from the second portable record mediums into the storage apparatus,
    - detecting a current amount of the first export data in the storage apparatus and a current amount of the second export data still unread from the second portable record mediums, and
    - determining when to start writing the export data to the first portable record medium, based on the current amount of the first export data and the current amount of the second export data.

10. The storage system according to claim 9, wherein the determining when to start writing the export data includes starting to write the export data to the first portable record medium when the current amount of the first export data exceeds the current amount of the second export data, and when the access devices outnumbers the second portable record mediums containing the second export data to be read.

11. The storage system according to claim 10, wherein:
- the reading the second export data uses all of the plurality of access devices when the current amount of the first export data is smaller than or equal to the current amount of the second export data, or when the access devices does not outnumber the second portable record mediums; and
- the writing the export data to the first portable record medium is executed in parallel with the reading the second export data.

12. The storage system according to claim 10, wherein the reading out the second export data uses all unused access devices in parallel, when the current amount of the first export data exceeds the current amount of the second export data, and when the access devices outnumbers the second portable record mediums.

13. The storage system according to claim 10, wherein the reading the second export data includes reading out data from the second portable record mediums in descending order of amount of the second export data stored therein.

14. The storage system according to claim 9, wherein:
- the reading the second export data uses all of the plurality of access devices when the current amount of the first export data is smaller than or equal to the current amount of the second export data; and
- the writing the export data to the first portable record medium is executed in parallel with the reading the second export data, when the current amount of the first export data is larger than the current amount of the second export data.

15. The storage system according to claim 9, wherein the reading the second export data uses all unused access devices in parallel, when the current amount of the first export data is larger than the current amount of the second export data.

16. The storage system according to claim 9, wherein the procedure further comprises:
- managing, for each dataset stored in the portable record mediums, a counter indicating how many times the dataset has been designated as export data, or a time record indicating when a latest designation as export data was made to the dataset;
- selecting one or more of the datasets whose corresponding counters indicate values smaller than a specified threshold, or whose corresponding time records fall in a specified time range; and
- moving the selected datasets to one portable record medium.

17. A storage control apparatus, connected to a plurality of access devices which access a portable record medium and a storage apparatus which temporarily stores data, for controlling data transfer via the plurality of access devices between the plurality of portable record mediums and the storage apparatus, the storage control apparatus comprising:
- one or more processors configured to perform a procedure including:
    - accepting designation of export data that is to be written to a first portable record medium to be ejected,
    - dividing the designated export data into first export data and second export data, the first export data being already in the storage apparatus, the second export data being in the second portable record mediums, but not in the storage apparatus,
    - reading the second export data from the second portable record mediums into the storage apparatus,
    - detecting a current amount of the first export data in the storage apparatus and a current amount of the second export data still unread from the second portable record mediums, and
    - determining when to start writing the export data to the first portable record medium, based on the current amount of the first export data and the current amount of the second export data.

* * * * *